US012730645B2

(12) United States Patent
Soundararajan et al.

(10) Patent No.: US 12,730,645 B2
(45) Date of Patent: Sep. 8, 2026

(54) DEVICE, METHOD AND SYSTEM TO CAPTURE OR RESTORE MICROARCHITECTURAL STATE OF A PROCESSOR CORE

(71) Applicant: Intel Corporation, Santa Clara, CA (US)

(72) Inventors: Niranjan Soundararajan, Bengaluru (IN); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/084,425

(22) Filed: Dec. 19, 2022

(65) Prior Publication Data

US 2024/0202000 A1 Jun. 20, 2024

(51) Int. Cl.
*G06F 9/38* (2018.01)
*G06F 9/30* (2018.01)

(52) U.S. Cl.
CPC .......... *G06F 9/3806* (2013.01); *G06F 9/3016* (2013.01)

(58) Field of Classification Search
CPC ............................ G06F 9/3016; G06F 9/3806
See application file for complete search history.

(56) References Cited

U.S. PATENT DOCUMENTS 7,849,387 B2 12/2010 Biswas et al.
2019/0138720 A1* 5/2019 Grewal ................ G06F 9/3863
2020/0409770 A1* 12/2020 Ould-Ahmed-Vall ...................... G06F 9/3877
2021/0064378 A1* 3/2021 Al Sheikh ............ G06F 9/3851
2021/0089411 A1 3/2021 Prasad et al.
2024/0153572 A1* 5/2024 Moshe .................. G11C 29/14

FOREIGN PATENT DOCUMENTS

GB 2574042 A * 11/2019 .......... G06F 9/3806

OTHER PUBLICATIONS

Gan, Yu, et al., "The Architectural Implications of Cloud Microservices", IEEE Computer Architecture Letters, vol. 17, No. 2, Jul.-Dec. 2018, 4 pgs.

(Continued)

*Primary Examiner* — Zachary K Huson
(74) *Attorney, Agent, or Firm* — Essential Patents Group, LLP

(57) ABSTRACT

Techniques and mechanisms for efficiently saving and recovering state of a processor core. In an embodiment, a processor core fetches and decodes a first instruction to generate a first decoded instruction, wherein the first instruction comprises a first opcode which corresponds to one or more components of the processor core. Execution of the first instruction comprises saving microarchitectural state of the one or more components to a memory of the core. In another embodiment, a processor core fetches and decodes a second instruction to generate a second decoded instruction, wherein the second instruction comprises a second opcode which corresponds to the same one or more components. Execution of the second instruction comprises restoring the microarchitectural state from the memory to the one or more components.

20 Claims, 20 Drawing Sheets

(56) References Cited

OTHER PUBLICATIONS

Shahrad, Mohammad, et al., "Architectural Implications of Function-as-a-Service Computing", MICRO-52, Oct. 12-16, 2019, Columbus, OH, USA, 13 pgs.
Sriraman, Akshitha, et al., "SoftSKU: Optimizing Server Architectures for Microservice Diversity", ISCA '19, Jun. 22-26, 2019, Phoenix, AZ, USA, 14 pgs.
Zhu, Yuhao, et al., "Microarchitectural Implications of Event-driven Server-side Web applications", 48th Annual IEEE/ACM International Symposium on Microarchitecture (MICRO), pp. 762-774, 2015.

* cited by examiner

PIPELINE 900

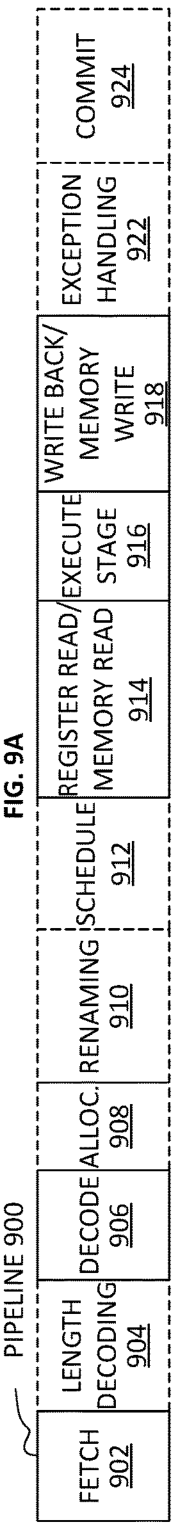

FIG. 9A
FETCH 902
LENGTH DECODING 904
DECODE 906
ALLOC. 908
RENAMING 910
SCHEDULE 912
REGISTER READ/ MEMORY READ 914
EXECUTE STAGE 916
WRITE BACK/ MEMORY WRITE 918
EXCEPTION HANDLING 922
COMMIT 924
CORE 990
BRANCH PREDICTION 932
INSTRUCTION CACHE 934
INSTRUCTION TLB 936
INSTRUCTION FETCH 938
DECODE CIRCUITRY 940
FRONT END 930
RETIREMENT UNIT 954
RENAME / ALLOCATOR UNIT 952
SCHEDULER(S) 956

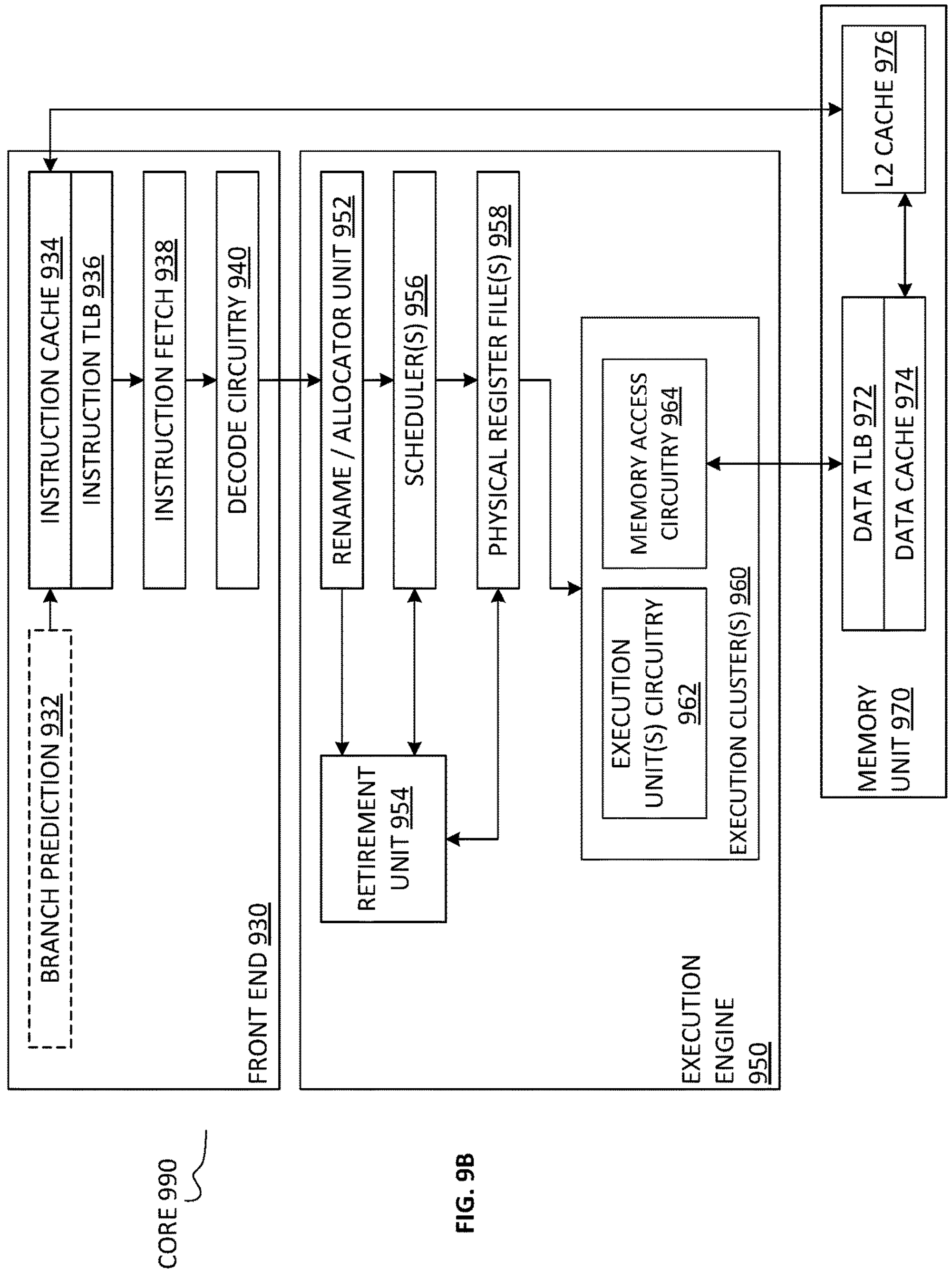

FIG. 9B
PHYSICAL REGISTER FILE(S) 958
EXECUTION UNIT(S) CIRCUITRY 962
MEMORY ACCESS CIRCUITRY 964
EXECUTION ENGINE 950
EXECUTION CLUSTER(S) 960
MEMORY UNIT 970
DATA TLB 972
DATA CACHE 974
L2 CACHE 976

Prefix 1201(A)

| 7 | 6 | 5 | 4 | 3 | 2 | 1 | 0 |
|---|---|---|---|---|---|---|---|
| 0 | 1 | 0 | 0 | W | R | X | B |

Prefix 1201(A)
Opcode 1203
MOD R/M 1302
MOD 1342
!=11
Reg 1344
rrr
R/M 1346
bbb
Rrrr
Bbbb Prefix 1201(A)
Opcode 1203
MOD R/M 1302
MOD 1342
11
Reg 1344
rrr
R/M 1346
bbb
Rrrr
Bbbb Prefix 1201(A)
Opcode 1203
MOD R/M 1302
MOD 1342
!=11
Reg 1344
rrr
R/M 1346
100
SIB 1304
SCL 1352
Index 1354
xxx
Base 1356
bbb
Rrrr
Xxxx
Bbbb Prefix 1201(A)
Opcode 1203
MOD R/M 1302
Reg 1344
bbb
Bbbb

DEVICE, METHOD AND SYSTEM TO CAPTURE OR RESTORE MICROARCHITECTURAL STATE OF A PROCESSOR CORE

BACKGROUND

1. Technical Field

This disclosure generally relates to processors and more particularly, but not exclusively, to the saving and recovery of microarchitectural state of a processor core.

2. Background Art

Modern datacenter software stacks typically run in multi-tenant datacenter environments, which are often characterized by interpreted and just-in-time (JIT) compiled codes, by numerous background (micro)services-e.g., multiple threads and/or function-as-a-service (FaaS) applications- and/or by large instruction footprints. Servers today often suffer from major instruction supply bottlenecks, high frequency context switches and high address translation overheads, usually as part of a highly virtualized container-based execution. Unfortunately, processor design places a great focus on improving performance of traditional SPEChpc-like benchmarks, without taking into consideration various aspects of the overall datacenter ecosystem and its evolution.

Microservices and Function-as-a-Service (FAAS) based applications have emerged as an important category of applications. Netflix, Twitter, Facebook, Amazon Lambda, Microsoft Azure are some examples of server/cloud-based companies that have adopted a microservices and FaaS models to build their software ecosystem. The characteristics of these applications-e.g., in terms of code length, being monolithic code-based, static compiled versus interpreted, etc.-have underlying implications which impact processor core performance.

BRIEF DESCRIPTION OF THE DRAWINGS

The various embodiments of the present invention are illustrated by way of example, and not by way of limitation, in the figures of the accompanying drawings and in which:

FIG. 9A is a block diagram illustrating both an exemplary in-order pipeline and an exemplary register renaming, out-of-order issue/execution pipeline according to examples.

FIG. 9B is a block diagram illustrating both an exemplary example of an in-order architecture core and an exemplary register renaming, out-of-order issue/execution architecture core to be included in a processor according to examples.

DETAILED DESCRIPTION

Figure 1:
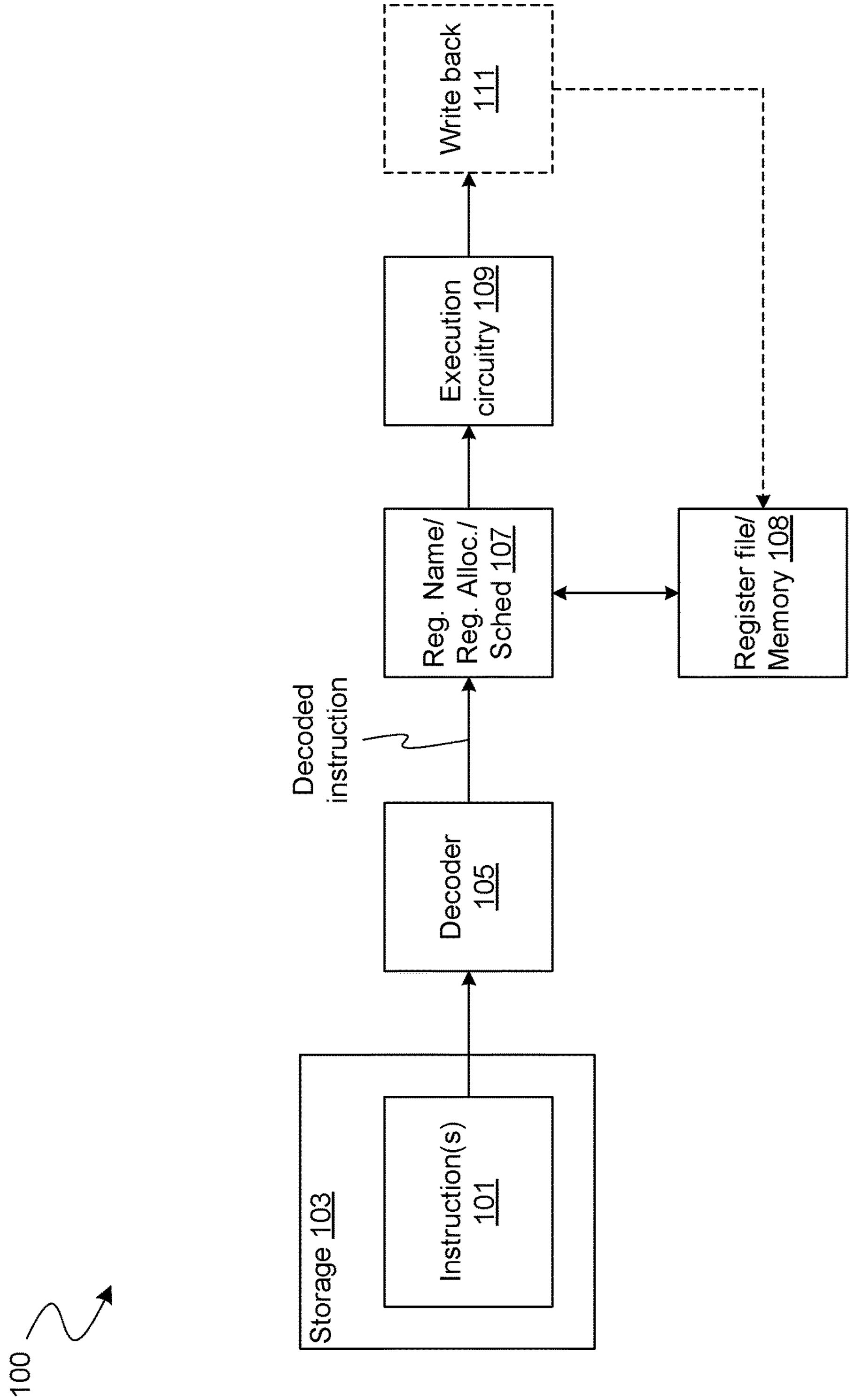
FIG. 1 shows a functional block diagram illustrating features of a processor core which is to capture or restore microarchitectural state according to an embodiment.

Embodiments discussed herein variously provide techniques and mechanisms for efficiently saving and recovering state of a processor core. One characteristic of disaggregated application technologies—such as microservices and Function-as-a-Service (FAAS) based applications-is that, as functionalities are broken into separate tasks (often functions that perform specific operation), the duration of each of these tasks is often relatively short. As such, there is significant time involved in (re)initialization-sometimes referred to as "warmup"-of a CPU's microarchitecture state, soon after which the task itself terminates. Hence, such tasks rarely operate with high microarchitecture efficiency on account of their relatively short duration of execution, and on account of ultra-fast context switching in these execution environments. Given that some types of application variously utilize several instances of the same function, different embodiments variously provide an opportunity for significant performance improvement where the repeated initialization cost can be avoided.

Some embodiments dramatically reduce the (re)initialization cost (such as that which impacts function-based services) by enabling the saving and restoring of microarchitectural state through instructions which, for example, are inserted at appropriate locations by a compiler. In various embodiments, an instruction set architecture (ISA) of a processor supports a type of instruction which triggers a quick capture of the microarchitectural state. In one such embodiment, the captured microarchitectural state spans any of various combinations of one or more processor structures including, but not limited to, a branch predictor, a branch target buffer, a micro-operation (micro-op) cache, and/or the like. Additionally or alternatively, an ISA supports another type of instruction which triggers operations to quickly recover some or all of a previously captured microarchitectural state to the processor core.

In various embodiments, a core of a processor comprises first circuit resources (referred to herein as "front-end resources," or simply as a "front-end") which provide functionality to fetch and decode instructions. For example, a front-end of a processor core comprises a fetch unit to fetch instructions from a memory, and a decoder to decode the instructions, wherein the instructions comprise any of various checkpoint instructions as described herein, and/or any of various restore instructions as described herein. In one such embodiment, the processor core further comprises second circuit resources (referred to herein as "back-end resources," or simply as a "back-end") which provide functionality to execute some or all of the decoded instructions which are provided by the first circuit resources.

In some embodiments, a back-end of a processor core comprises execution circuitry to perform one or more operations corresponding to a checkpoint instruction, wherein performing the one or more operations comprises the back-end storing, to memory, microarchitectural state information which corresponds to one or more components of the front-end. An encoding of a checkpoint instruction comprises (for example) a field to specify a first front-end component of the one or more front-end components. Additionally or alternatively, an encoding of a checkpoint instruction comprises one or more fields to specify a memory location at which to store the microarchitectural state information.

The term "microarchitectural state" (sometimes referred to as "microarchitectural context") is to be distinguished, for example, from the term "architectural state." Microarchitectural state includes some internal state of one or more components of a processor core-e.g., where said internal state results at least in part from the execution of a given sequence of instructions. However, this internal state of the processor core is to be distinguished from the state of execution of the sequence itself. For example, microarchitectural state is typically not exposed outside of the processor in question. By contrast, architectural state typically includes information-in various register files and/or memory-which represents the state of execution of a particular sequence of instructions.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including a processor which supports instruction execution to save or restore core state.

FIG. 1 illustrates one example of a processor 100 which is to process an instruction according to an embodiment. By way of illustration and not limitation, an instruction which is processed with processor 100 is one of a first instruction type (a "checkpoint" type herein) which is to save microarchitectural state, or a second instruction type (a "restore" type herein) which is to recover previously saved microarchitectural state to a processor core. As illustrated, storage 103 stores an instruction 101 to be executed. As described herein, instruction 101 is (for example) any of various instructions which are to checkpoint- or alternatively, to restore-some or all of the microarchitectural state of one or more components of a processor core.

The instruction 101 is received by decoder circuitry 105. For example, the decoder circuitry 105 receives this instruction from fetch circuitry (not shown). The instruction may be in any suitable format, such as that describe with reference to FIG. 12 below. Although some embodiments are not limited in this regard, one example format for the instruction 101 is simply an OPCODE-i.e., merely an opcode mnemonic of instruction 101. In other embodiments, the format of instruction 101 comprises OPCODE DST, wherein DST is a field for the destination operand, such as a location in a memory to which state information is to be saved. In still other embodiments, the format of instruction 101 comprises OPCODE SRC, wherein SRC is a field for the source operand, such as a location in a memory from which state information is to be retrieved. In some examples, the sources and destination are registers, and in other examples one or more are memory locations. In some examples, one or more of the sources may be an immediate operand. In some examples, the opcode details a particular one or more checkpoint operations (or a particular one or more restore operations) to be performed.

The decoder circuitry 105 decodes the instruction into one or more operations. In some examples, this decoding includes generating a plurality of micro-operations to be performed by execution circuitry (such as execution circuitry 109). The decoder circuitry 105 also decodes instruction prefixes, in some embodiments.

In some examples, register renaming, register allocation, and/or scheduling circuitry 107 provides functionality for one or more of: 1) renaming logical operand values to physical operand values (e.g., a register alias table in some examples), 2) allocating status bits and flags to the decoded instruction, and 3) scheduling the decoded instruction for execution by execution circuitry out of an instruction pool (e.g., using a reservation station in some examples).

Registers (register file) and/or memory 108 store data as operands of the instruction to be operated on by execution circuitry 109. Exemplary register types include packed data registers, general purpose registers (GPRs), and floating-point registers.

Execution circuitry 109 executes the decoded instruction. Exemplary detailed execution circuitry includes execution cluster(s) 960 shown in FIG. 9B, etc. The execution of the decoded instruction causes the execution circuitry to save (or alternatively, to recover) microarchitectural state of one or more components of a processor core.

In some example embodiments, retirement/write back circuitry 111 architecturally commits the destination register into the registers or memory 108 and retires the instruction.

Some embodiments variously provide mechanisms to checkpoint the microarchitectural state of a processor core during the execution of a given process, and to restore such microarchitectural state when (for example) the same process is to resume, repeat, or otherwise execute. Given that microservice or FaaS-based applications often implement several instances of the same service being called for different requests, some embodiments-in providing for an efficient restoration of microarchitectural context-significantly improve the performance of an individual service, which in turn facilitates improvement to an overall application's throughput. Such embodiments variously provide one or more new ISA instructions with which software is able to direct hardware of a processor core as to when core state is to be checkpointed and/or restored.

Figure 2:
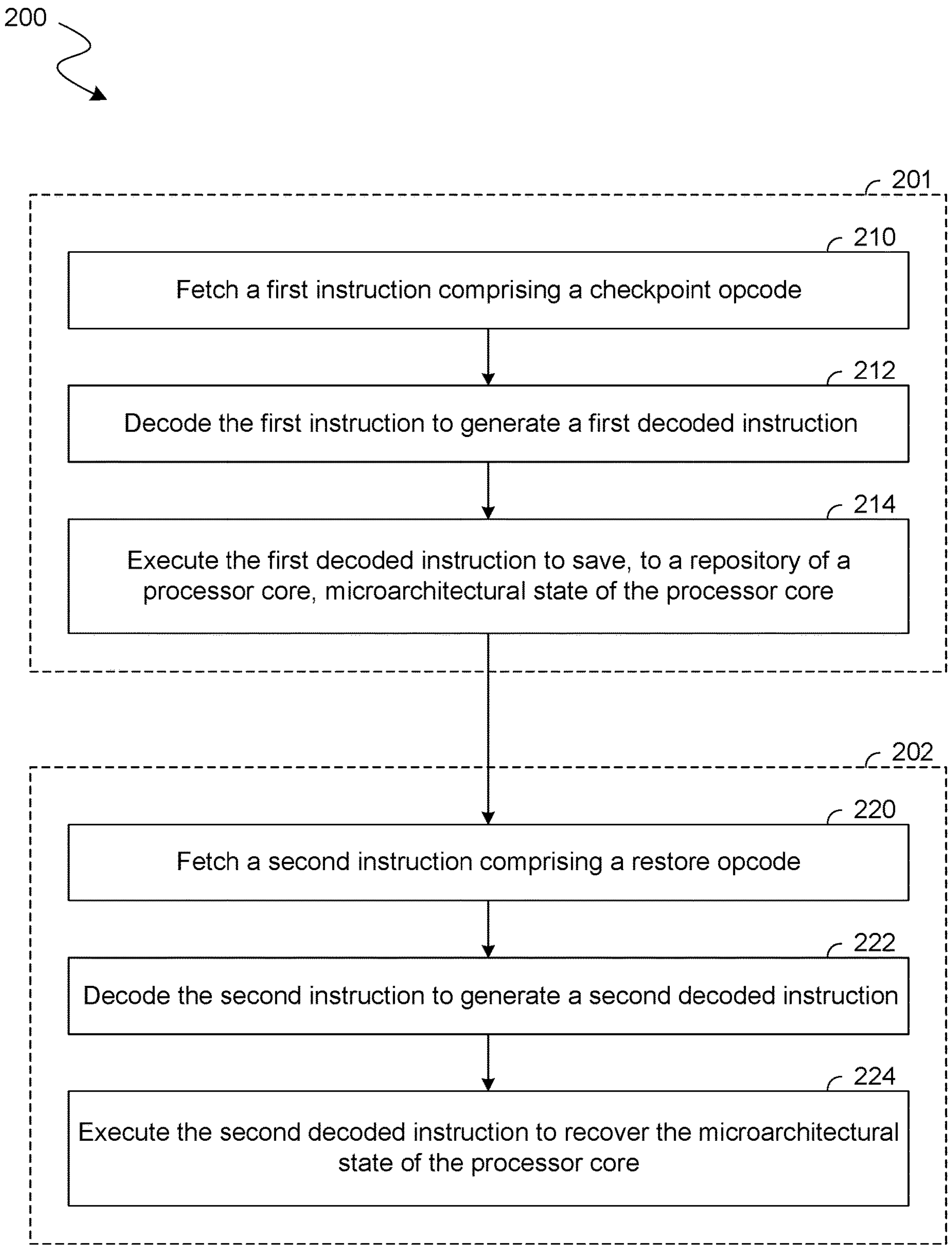
FIG. 2 shows a flow diagram illustrating features of a method to determine microarchitectural state of a processor core according to an embodiment.

FIG. 2 shows features of a method 200 to determine microarchitectural state of a processor core according to an embodiment. The method 200 illustrates one example of an embodiment wherein an instruction is executed to checkpoint- or alternatively, to recover-at least some microarchitectural state of one or more components of a processor core. In some embodiments, operations such as those of method 200 are performed with a core of processor 100. For example, a processor core as shown in FIG. 9B, a pipeline as detailed below, etc., performs method 200.

In some embodiments, method 200 comprises operations 201 which checkpoint microarchitectural state of a core. As shown in FIG. 2, operations 201 comprise fetching a first instruction (at 210) which comprises a first ("checkpoint") opcode indicating that at least some state of the processor core is to be saved. In some embodiments, the first instruction is fetched from an instruction cache. In various embodiments, the first opcode corresponds to one or more components of the processor core. For example, in one such embodiment, the first opcode indicates to the processor core-e.g., by the respective component type(s)- the one or more core components for which microarchitectural state is to be saved. By way of illustration and not limitation, the first instruction comprises a "CheckptBPU" opcode (or other suitable opcode) which indicates that microarchitectural state of a branch prediction unit (BPU)-e.g., only the BPU-is to be saved to a memory, cache or other suitable repository of the core. In another embodiment, the first instruction comprises a "CheckptBTB" opcode (or other suitable opcode) which indicates that microarchitectural state of a branch target buffer (BTB)-e.g., only the BTB-is to be saved. In still another embodiment, the first instruction comprises a "Checkptucache" opcode (or other suitable opcode) which indicates that microarchitectural state of a micro-operation cache-e.g., only a micro-operation cache-is to be saved. In still another embodiment, the first instruction comprises a "Checkptuarch" opcode (or other suitable opcode) which indicates that, for each of multiple core components, respective microarchitectural state of the component is to be saved.

The fetched first instruction is decoded at 212 to generate a first decoded instruction (e.g., comprising a first one or more micro-operations). For example, the fetched first instruction is decoded by decoder circuitry such as decoder circuitry 105 or decode circuitry 940 detailed herein. In some embodiments, operations 201 further perform a scheduling (not shown) of the first decoded instruction for execution.

At 214, operations 201 execute the first decoded instruction with execution circuitry (hardware) such as execution circuitry 109 shown in FIG. 1, or execution cluster(s) 960 shown in FIG. 9B. In various embodiments, the execution performed at 214 saves microarchitectural state of the processor core to a repository of the processor core. For example, the microarchitectural state comprises some or all of the current context of a branch prediction unit (BPU), a branch target buffer (BTB), a micro-operation cache, and/or the like. In some embodiments, the repository comprises a memory or (for example) a cache such as that of a cache hierarchy. In some embodiments, operations 201 further perform a committing or retiring (not shown) of the first decoded instruction.

In various embodiments, operations 201 are performed with a processor core which provides functionality to fetch, decode, and execute any of a first plurality of instructions including the first instruction. In one such embodiment, the first plurality of instructions comprises respective opcodes which each correspond to a different respective set of one or more components of the processor core. For each of the first plurality of instructions, execution of the instruction is to checkpoint microarchitectural state for the corresponding one or more components of the processor core. By way of illustration and not limitation, the first plurality of instructions comprises two or more of a "CheckptBPU" instruction, a "CheckptBTB" instruction, a "Checkptucache", or a "Checkptuarch" instruction, in some embodiments.

In some embodiments, method 200 additionally or alternatively comprises operations 202 which restore microarchitectural state (such as that which is previously checkpointed by operations 201) to the processor core. As shown in FIG. 2, operations 202 comprise fetching a second instruction (at 220) which comprises a second ("restore") opcode indicating that at least some state of the processor core is to be recovered from a repository of the core. In some embodiments, the second instruction is fetched from an instruction cache. In various embodiments, the second opcode corresponds to one or more components of the processor core. For example, the second opcode indicates to the processor core-e.g., by respective component type(s)- the one or more core components for which microarchitectural state is to be recovered from a repository. By way of illustration and not limitation, the second instruction comprises a "RestoreBPU" opcode (or other suitable opcode) which indicates that microarchitectural state of a BPU-e.g., only a BPU-is to be recovered from a memory, cache or other suitable repository of the core. In another embodiment, the second instruction comprises a "RestoreBTB" opcode (or other suitable opcode) which indicates that microarchitectural state of a BTB-e.g., only a BTB-is to be recovered from the repository. In still another embodiment, the second instruction comprises a "Restoreucache" opcode (or other suitable opcode) which indicates that microarchitectural state of a micro-operation cache-e.g., only a micro-operation cache-is to be recovered from the repository. In still another embodiment, the second instruction comprises a "Restoreuarch" opcode (or other suitable opcode) which indicates that, for each of multiple core components, respective microarchitectural state of the component is to be recovered from the repository.

The fetched second instruction is decoded at 222 to generate a second decoded instruction (e.g., comprising a second one or more micro-operations). For example, the fetched second instruction is decoded by decoder circuitry such as decoder circuitry 105 or decode circuitry 940. In some embodiments, operations 202 further perform a scheduling (not shown) of the second decoded instruction for execution.

At 224, operations 202 execute the second decoded instruction with the execution circuitry of the core. In various embodiments, the execution performed at 224 recovers microarchitectural state from a repository of the processor core to one or more components of the processor core. For example, the microarchitectural state comprises previously checkpointed context of a BPU, a BTB, a micro-operation cache, and/or the like. In some embodiments, operations 202 further perform a committing or retiring (not shown) of the second decoded instruction.

In various embodiments, operations 202 are performed with a processor core which provides functionality to fetch, decode, and execute any of a second plurality of instructions including the second instruction. In one such embodiment, the second plurality of instructions comprises respective opcodes which each correspond to a different respective set of one or more components of the processor core. For each of the second plurality of instructions, execution of the instruction is to recover microarchitectural state of the corresponding one or more components of the processor core. By way of illustration and not limitation, the second plurality of instructions comprises two or more of a "RestoreBPU" instruction, a "RestoreBTB" instruction, a "Restoreucache", or a "Restoreuarch" instruction, in some embodiments.

Figure 3A:
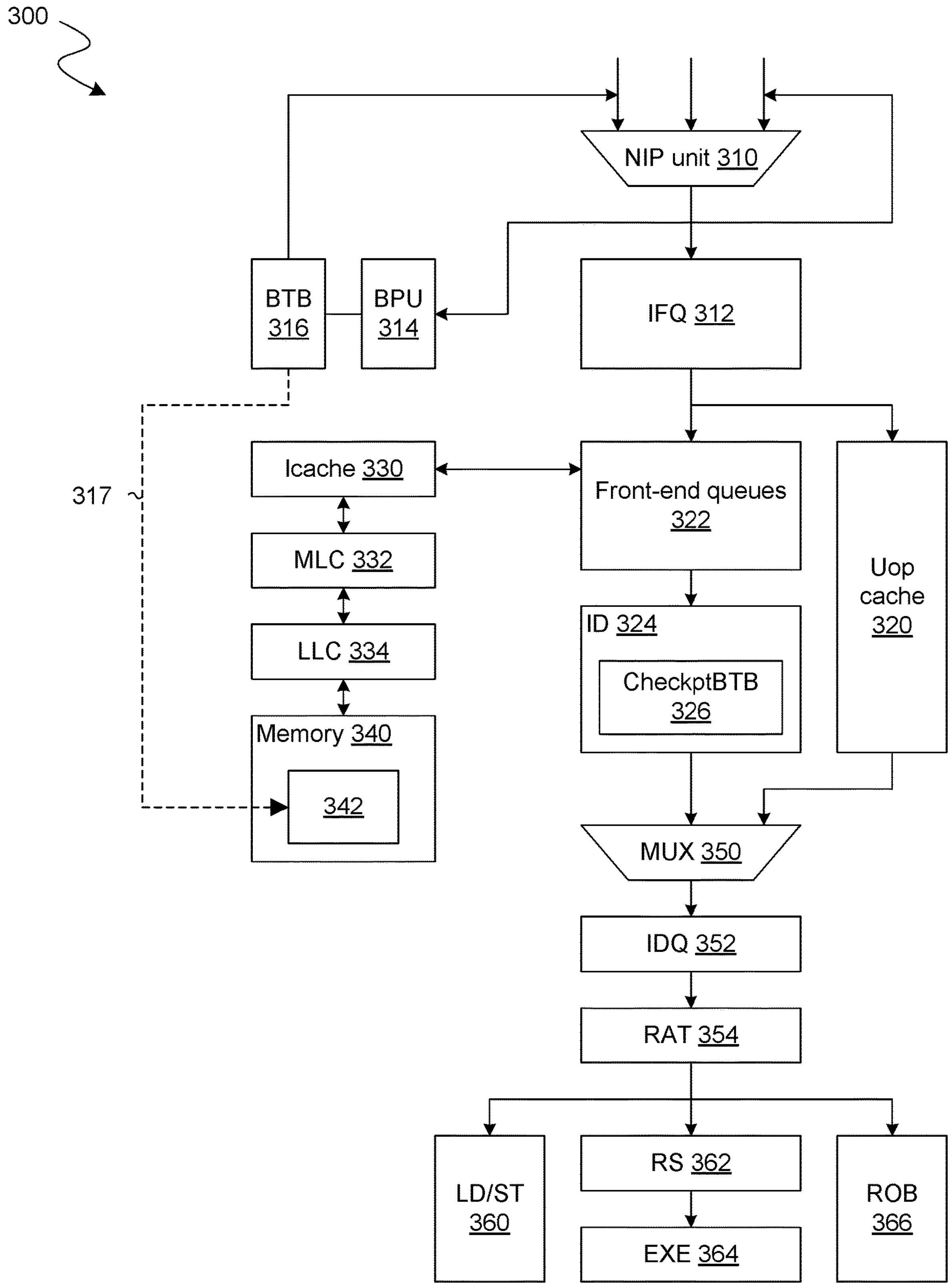
FIGS. 3A, 3B show functional block diagrams each illustrating respective operations by a processor core to capture or restore state of a branch target buffer according to a corresponding embodiment.

FIG. 3A shows features of a processor core 300 to capture state of a branch target buffer according to an embodiment. Core 300 illustrates one example of an embodiment which comprises an instruction set architecture (ISA) that supports the execution of an instruction to save microarchitectural state of a branch target buffer. In various embodiments, core 300 provides functionality such as that of a core of processor 100-e.g., wherein one or more operations of method 200 are performed with a core of processor 100.

In an embodiment, an instruction pointer generation stage of processor core 300 selects instruction pointers (e.g., memory addresses) which identify the next instruction that is to be fetched and executed by core 300 as part of an executing program sequence. In one embodiment, the instruction pointer generation stage increments the memory address of the most recently fetched instruction by a predetermined amount X (e.g., 1), each clock cycle. In the example embodiment illustrated by FIG. 3A, the instruction pointer generation stage comprises a next instruction pointer (NIP) unit 310, a branch prediction unit (BPU) 314, and a branch target buffer (BTB) 316.

The NIP unit 310 comprises circuitry which is operable to determine a next instruction pointer (IP) after the current IP in an executing sequence of instructions-e.g., where (for example) the current IP refers to an instruction which is currently being prepared for execution. In the example embodiment shown, NIP unit 310 outputs an IP value to BPU 314 to facilitate the prediction of a branch to be taken in the executing sequence of instructions. In certain embodiments, BTB 316 is coupled to store (e.g., in a branch predictor array) predicted target instructions which each correspond to a different respective branch instruction (e.g., one of multiple branch instructions of a section of code that has been executed multiple times). Some or all of NIP unit 310, BPU 314 and BTB 316 variously provide functionality which (for example) is adapted from conventional processor techniques for branch prediction and/or other features of instruction pointer generation. To avoid obscuring certain features of various embodiments, such conventional processor techniques are not detailed herein (and are not limiting on said embodiments).

A fetch stage of core 300 accepts instruction pointers from the instruction pointer generation stage, and fetches the corresponding instructions-e.g., from a memory (not shown), or from an instruction cache (Icache) 330. In some embodiments, Icache 330 is one of various repositories of instructions, data and/or other information-e.g., wherein other such repositories of core 300 include (but are not limited to) a mid-level cache (MLC) 332, a last level cache (LLC) 334, a memory 340, and/or the like.

In the example embodiment shown, the fetch stage comprises an instruction fetch queue (IFQ) 312 and, for example, Icache 330, and/or the illustrative one or more front-end queues 322 shown. In one such embodiment, NIP unit 310 selects an IP from a set of inputs, and provides the selected IP to IFQ 312 (e.g., as well as to BPU 314). Based on the selected IP, IFQ 312 fetches and enqueues a corresponding instruction-e.g., wherein IFQ 312 provides the instruction to the one or more front-end queues 322, or signals the one or more front-end queues 322 to enqueue an instruction from Icache 330.

A decode stage of core 300 performs operations to decode an instruction into a decoded instruction which (for example) comprises one or more micro-operations. In the example embodiment shown, the decode stage comprises an instruction decoder (ID) 324 which is coupled to receive instructions-e.g., from the one or more front-end queues 322. Circuitry of ID 324 is operable to perform various instruction decode operations, each to generate a respective one or more decoded instructions. Although some embodiments are not limited in this regard, a micro-operation (uop) cache 320 of core 300 further provides a repository of micro-operations (uops) generated by previously decoded instructions.

An execution stage of core 300 performs an operation as specified by a given decoded instruction. In the example embodiment shown, the execution stage comprises one or more execution units (EXE) 364 which (for example) are coupled to ID 324 via some or all of a merge multiplexer (MUX) 350, an instruction decode queue (IDQ) 352, and a register alias table (RAT) 354. In the example embodiment shown, MUX 350 is coupled to variously receive decoded instructions from ID 324, and is further coupled to receive from uop cache 320 one or more micro-operations of a previously decoded instruction.

For example, an instruction pointer, provided by IFQ 312, specifies or otherwise indicates a particular instruction to uop cache 320. Where it is determined that uop cache 320 has a cached version of one or more micro-operations which correspond to that particular instruction-e.g., from a previous instance of the instruction having been decoded-then uop cache 320 provides the corresponding one or more micro-operations to MUX 350. In one such embodiment, MUX 350 variously provides decoded instructions, each from a respective one of ID 324 or uop cache 320, for execution by EXE 364.

By way of illustration and not limitation, core 300 further comprises a load/store unit (LD/ST) 360, a reservation station (RS) 362, and/or a reorder buffer (ROB) 366, although some embodiments are not limited in this regard. In one such embodiment, MUX 350 transfers a stream of micro-operations-which are variously provided each from a respective one of ID 324 and uop cache 320-to EXE 364 (e.g., via IDQ 352, RAT 354, and RS 362). In one such embodiment, RS 362 orders, groups and/or otherwise arranges micro-operations for provisioning to EXE 364-e.g., where such provisioning is according to different functional units (including, for example, an integer execution unit, a floating point execution unit, a memory execution unit, an address generation unit, and/or the like) of EXE 364.

FIG. 3A shows execution of a new instruction (referred to herein as a "CheckptBTB" instruction) which saves microarchitectural state of a branch target buffer (BTB) according to an embodiment. In an illustrative scenario according to one embodiment, a CheckptBTB instruction is fetched and decoded, with IFQ 312 and ID 324 of core 300, to generate a decoded CheckptBTB instruction 326 which is subsequently provided to EXE 364 of core 300.

In executing the decoded CheckptBTB instruction 326, EXE 364 directly or indirectly signals BTB 316 to perform checkpointing-e.g., by participating in a communication 317 that saves at least some current BTB state to a repository (such as the illustrative region 342 in memory 340). Although some embodiments are not limited in this regard, some or all of the BTB state is compressed, prior to being saved to region 342, as part of the checkpointing which is performed by execution of the CheckptBTB instruction. In some embodiments, checkpointing additionally or alternatively saves some or all microarchitectural state to one or more caches, such as one of MLC 332 or LLC 334.

However, saving BTB (or other) state-even if compressed-in a cache hierarchy could noticeably degrade application performance, in some embodiments.

It is to be appreciated that core 300 (or, for example, any of the cores 400, 500 and 600 which are also described herein) is merely illustrative of one processor core architecture which facilitates the execution of an instruction that is to store or recover microarchitectural state. In different embodiments, any various other architectures-including some existing existing core architectures- are adapted to similarly support execution of such an instruction.

Figure 3B:
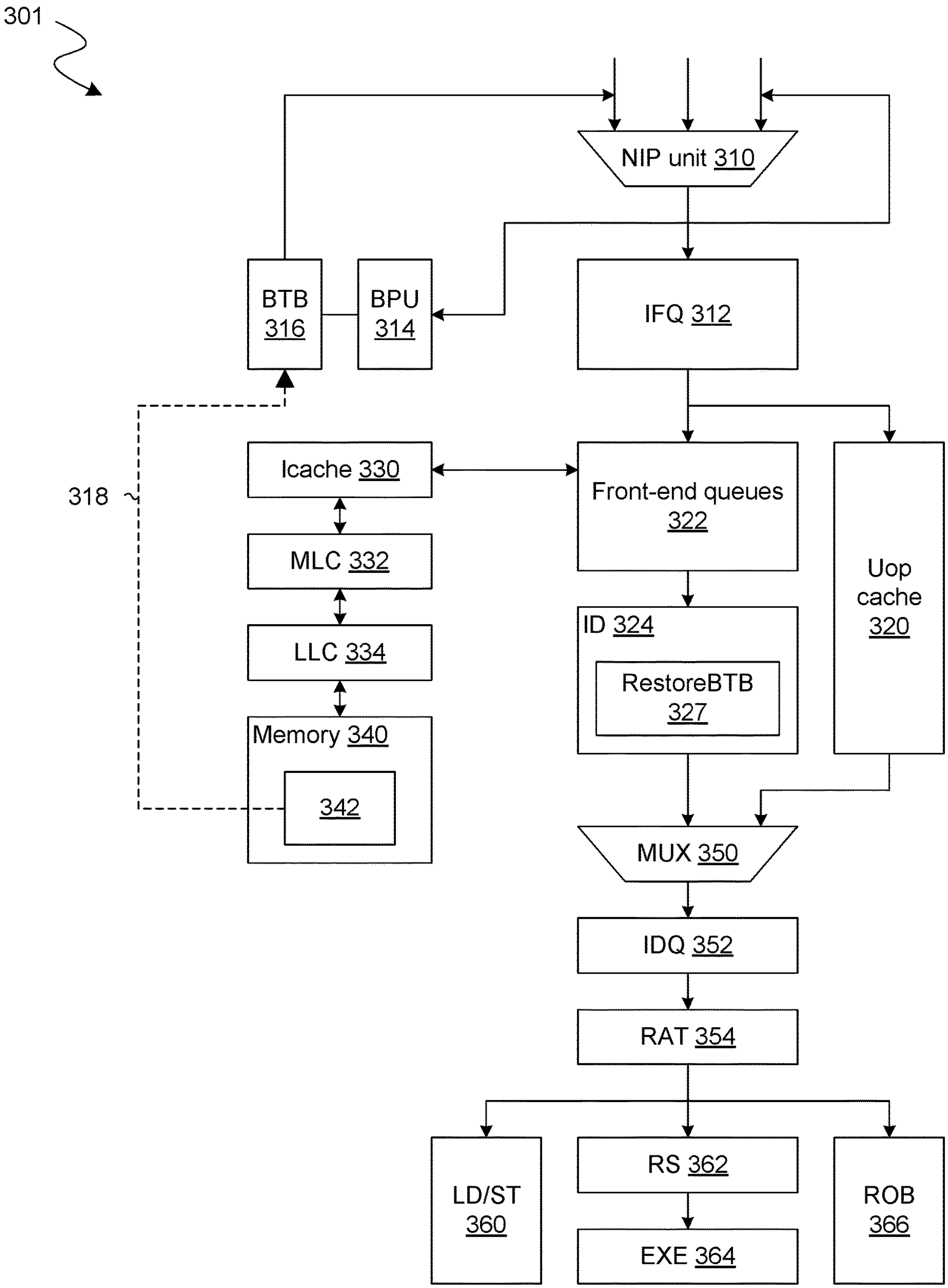

FIG. 3B shows a view 301 of operations by core 300 to restore state of a branch target buffer according to an embodiment. View 301 illustrates one example of an embodiment wherein the ISA of core 300 further supports the execution of another instruction to restore microarchitectural state such as that which is saved by execution of the decoded CheckptBTB instruction 326. Operations such as those illustrated by view 301 are performed, for example, according to method 200, in some embodiments.

As shown in FIG. 3B, execution of another new instruction (referred to herein as a "RestoreBTB" instruction) restores microarchitectural state of BTB 316 from region 342 of memory 340. In an illustrative scenario according to one embodiment, the RestoreBTB instruction is fetched and decoded, with IFQ 312 and ID 324, to generate a decoded RestoreBTB instruction 327 which is then provided to EXE 364. In executing the decoded RestoreBTB instruction 327. EXE 364 directly or indirectly signals a repository-such as the illustrative memory 340 shown-to participate in, or otherwise enable, a communication 318 of microarchitectural state which is restored from region 342 to BTB 316 (e.g., after the microarchitectural state is decompressed, in some embodiments).

In some embodiments, saving and recovery of microarchitectural state is variously performed on a per-thread basis-e.g., wherein CheckptBTB (or other) instructions are variously executed to perform microarchitectural checkpointing for different respective threads, and/or wherein RestoreBTB (or other) instructions are variously executed to perform microarchitectural recovery for different respective threads. Since BTB 316 usually has details on a currently running thread (wherein a given entry of BTB 316 includes a thread identifier, for example), some embodiments enable different states of BTB 316 to be variously checkpointed and restored per thread. For example, in some embodiments, memory 340 (or another such repository) provides one or more data structures-e.g., including a "checkpoint table" or any of various other suitable data structures-which are to track one or more locations in memory. In one embodiment, each such location corresponds to a respective processor structure (and, for example, a respective thread) for which microarchitectural state is to be saved and/or retrieved. A given one such memory location is accessible, for example, using a Service ID (SID) of the particular service in question-e.g., wherein the SID is provided by the software layer.

Figure 4A:
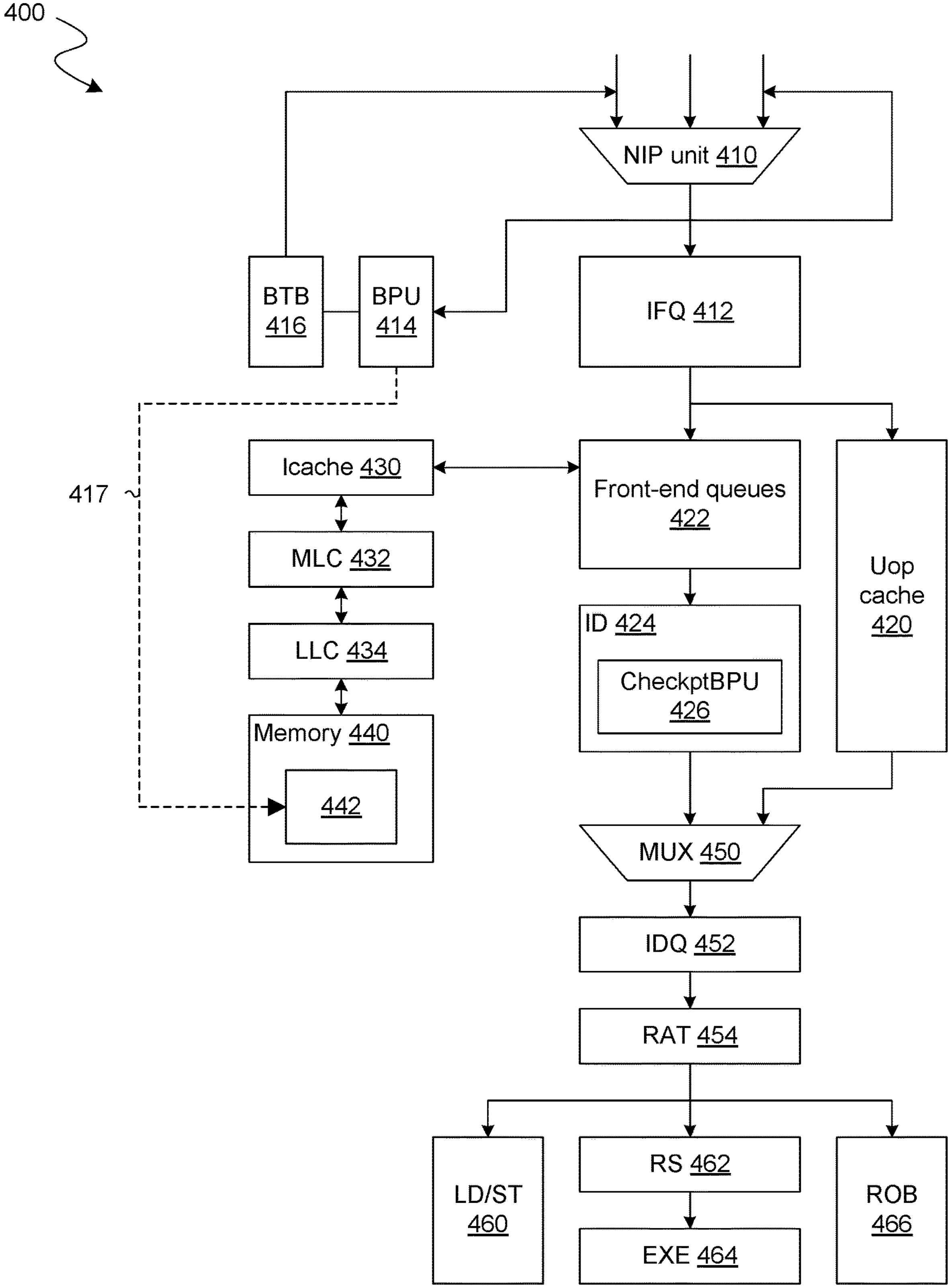
FIGS. 4A, 4B show functional block diagrams each illustrating respective operations by a processor core to capture or restore state of a branch prediction unit according to a corresponding embodiment.

FIG. 4A shows features of a core 400 to capture or restore state of a branch prediction unit according to an embodiment. Core 400 illustrates one example of an embodiment which comprises an ISA that supports the execution of an instruction to save microarchitectural state of a branch prediction unit. In various embodiments, core 400 provides functionality such as that of processor 100, or of core 300-e.g., wherein one or more operations of method 200 are performed with core 400.

As shown in FIG. 4A, core 400 comprises a next instruction pointer (NIP) unit 410, an instruction fetch queue (IFQ) 412, a micro-operation (uop) cache 420, front-end queues 422, and an instruction decoder (ID) 424 which, for example, correspond functionally to NIP unit 310, IFQ 312, uop cache 320, front-end queues 322, and ID 324 (respectively). Furthermore, core 300 comprises a merge multiplexer (MUX) 450, an instruction decode queue (IDQ) 452, a register alias table (RAT) 454, a load/store unit (LD/ST) 460, a reservation station (RS) 462, one or more execution units (EXE) 464, and a reorder buffer (ROB) 466 which, for example, correspond functionally to MUX 350, IDQ 352, RAT 354, LD/ST 360, RS 362, EXE 364, ROB 366 (respectively). Further still, a branch prediction unit (BPU) 414, and a branch target buffer (BTB) 416 of core 300 provide functionality of BPU 314, and BTB 316 (respectively)-e.g., wherein an instruction cache (Icache) 430, a mid-level cache (MLC) 432, a last level cache (LLC) 434, and a memory 440 of core 300 correspond functionally to Icache 330, MLC 332, LLC 334, and memory 340 (respectively).

FIG. 4A shows execution of another new instruction (referred to herein as a "CheckptBPU" instruction) which saves microarchitectural state of a branch prediction unit (BPU) according to an embodiment. In an illustrative scenario according to one embodiment, a CheckptBPU instruction is fetched and decoded, with IFQ 412 and ID 424 of core 400, to generate a decoded CheckptBPU instruction 426 which is subsequently provided to execution circuitry of the processor core.

In executing the decoded CheckptBPU instruction 426, EXE 464 directly or indirectly signals BPU 414 of core 400 to perform checkpointing-e.g., by participating in a communication 417 that saves at least some current BPU state to a repository (such as the illustrative memory 440 shown). Although some embodiments are not limited in this regard, some or all of the BPU state is compressed, prior to being saved to the repository, as part of the checkpointing which is performed by execution of the CheckptBPU instruction. In some embodiments, checkpointing additionally or alternatively saves some or all microarchitectural state to one or more caches, such as one of MLC 432 or LLC 434.

Figure 4B:
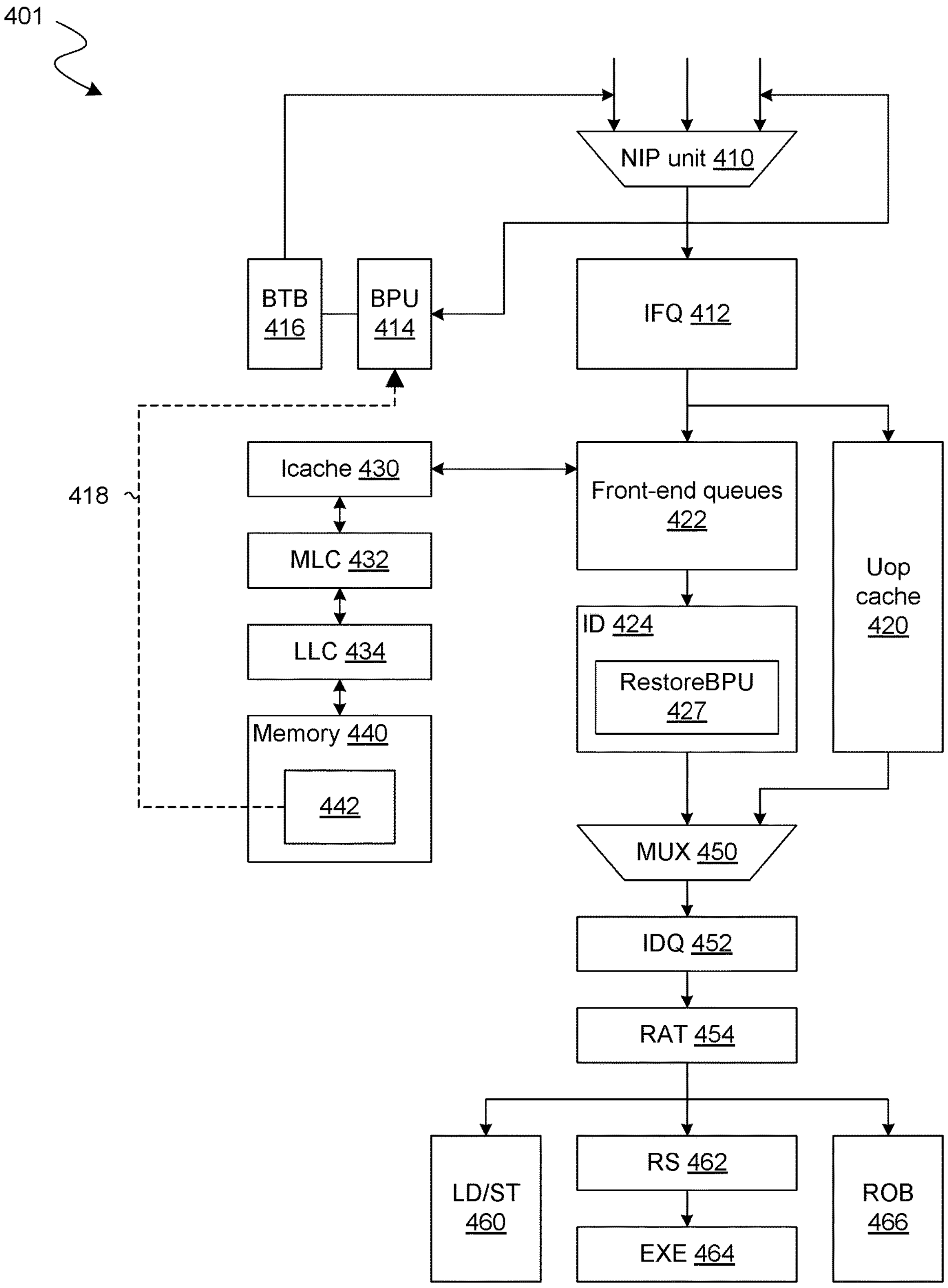

FIG. 4B shows a view 401 of operations by core 400 to restore state of a branch prediction unit according to an embodiment. View 401 illustrates one example of an embodiment wherein the ISA of core 400 further supports the execution of another instruction to restore microarchitectural state such as that which is saved by execution of the decoded CheckptBPU instruction 426. Operations such as those illustrated by view 401 are performed, for example, according to method 200, in some embodiments.

As shown in FIG. 4B, execution of another new instruction (referred to herein as a "RestoreBPU" instruction) restores microarchitectural state of BPU 414 from region 442 of memory 440. In an illustrative scenario according to one embodiment, the RestoreBPU instruction is fetched and decoded, with IFQ 412 and ID 424, to generate a decoded RestoreBPU instruction 427 which is then provided to EXE 464. In executing the decoded RestoreBPU instruction 427, EXE 464 directly or indirectly signals a repository-such as the illustrative memory 440 shown-to participate in, or otherwise enable, a communication 418 of microarchitectural state which is restored from region 442 to BPU 414 (e.g., after the microarchitectural state is decompressed, in some embodiments). In various embodiments, EXE 464 variously executes CheckptBPU instructions and RestoreBPU instructions on a per-thread basis.

Figure 5A:
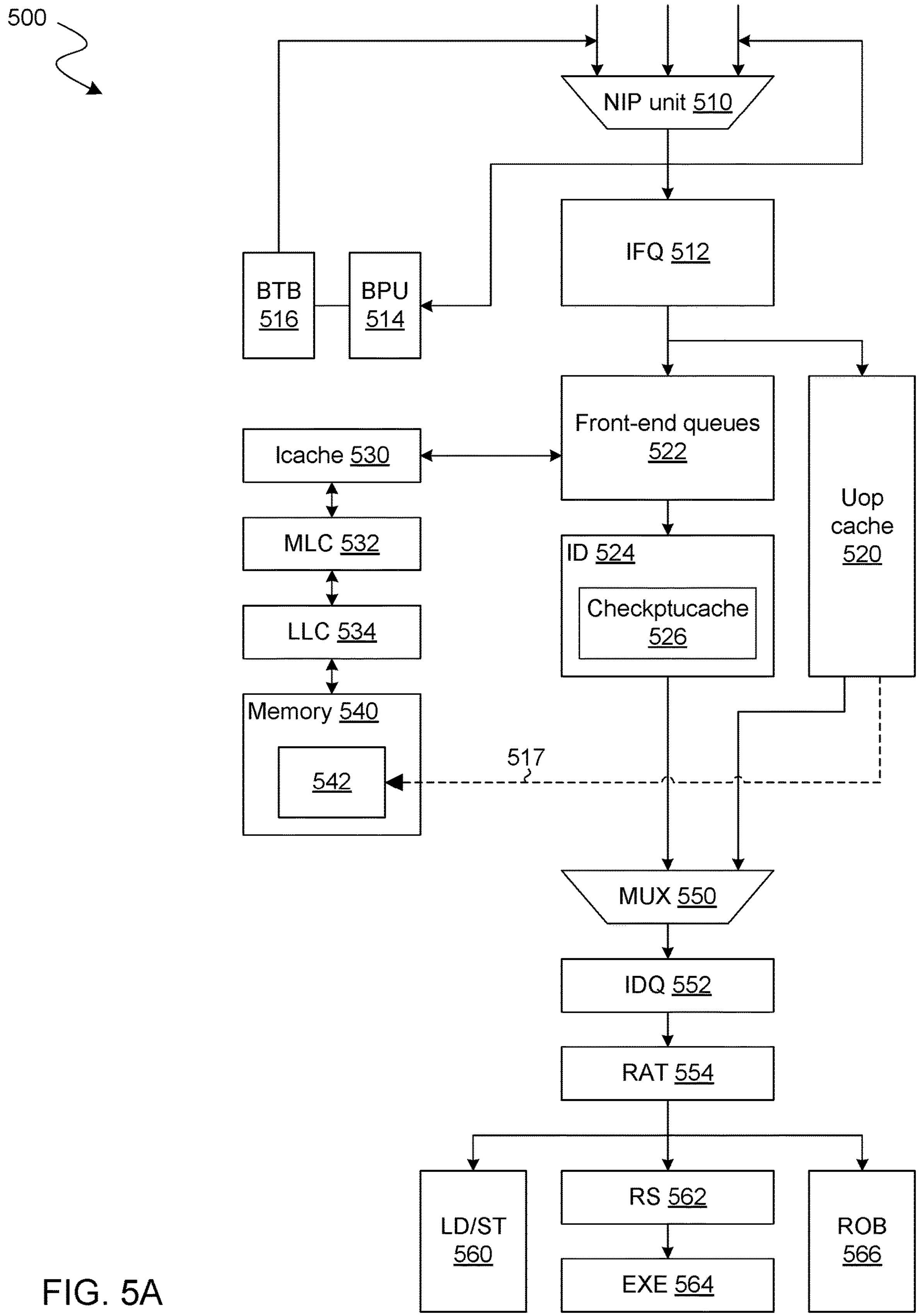
FIGS. 5A, 5B show functional block diagrams each illustrating respective operations by a processor core to capture or restore state of a micro-operation cache according to a corresponding embodiment.

FIG. 5A shows features of a core 500 to capture or restore state of a micro-operation (uop) cache according to an embodiment. Core 500 illustrates one example of an embodiment which comprises an ISA that supports the execution of an instruction to save microarchitectural state of a uop cache. In various embodiments, core 500 provides functionality such as that of processor 100, or of one of cores 300, 400-e.g., wherein one or more operations of method 200 are performed with core 500.

As shown in FIG. 5A, core 500 comprises a next instruction pointer (NIP) unit 510, an instruction fetch queue (IFQ) 512, a micro-operation (uop) cache 520, front-end queues 522, and an instruction decoder (ID) 524 which, for example, correspond functionally to NIP unit 310, IFQ 312, uop cache 320, front-end queues 322, and ID 324 (respectively). Furthermore, core 500 comprises a merge multiplexer (MUX) 550, an instruction decode queue (IDQ) 552, a register alias table (RAT) 554, a load/store unit (LD/ST) 560, a reservation station (RS) 562, one or more execution units (EXE) 564, and a reorder buffer (ROB) 566 which, for example, correspond functionally to MUX 350, IDQ 352, RAT 354, LD/ST 360, RS 362, EXE 364, ROB 366 (respectively). Further still, a branch prediction unit (BPU) 514, and a branch target buffer (BTB) 516 of core 500 provide functionality of BPU 314, and BTB 316 (respectively)-e.g., wherein an instruction cache (Icache) 530, a mid-level cache (MLC) 532, a last level cache (LLC) 534, and a memory 540 of core 500 correspond functionally to Icache 330, MLC 332, LLC 334, and memory 340 (respectively).

FIG. 5A shows execution of another new instruction (referred to herein as a "Checkptuop" instruction) which saves microarchitectural state of a micro-operation (uop) cache according to an embodiment. In an illustrative scenario according to one embodiment, a Checkptuop instruction is fetched and decoded, with IFQ 512 and ID 524 of core 500, to generate a decoded Checkptucache instruction 526 which is subsequently provided to execution circuitry of the processor core.

In executing the decoded Checkptuop instruction 526, EXE 564 directly or indirectly signals uop cache 520 of core 500 to perform checkpointing-e.g., by participating in a communication 517 that saves at least some current micro-operation cache state to a repository (such as the illustrative memory 540 shown). Although some embodiments are not limited in this regard, some or all of the micro-operation cache state is compressed, prior to being saved to the repository, as part of the checkpointing which is performed by execution of the Checkptuop instruction. In some embodiments, checkpointing additionally or alternatively saves some or all microarchitectural state to one or more caches, such as one of MLC 532 or LLC 534.

Figure 5B:
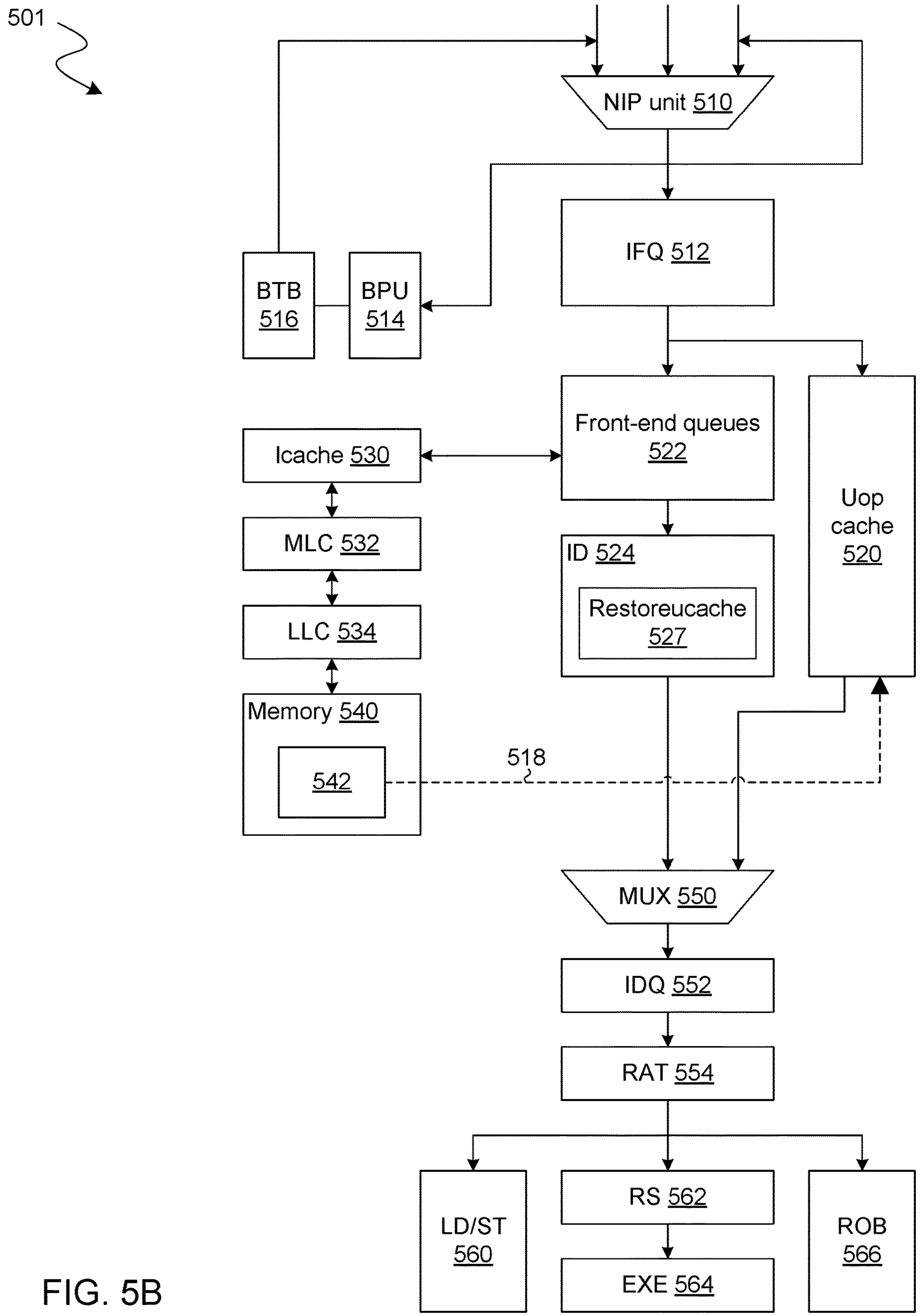

FIG. 5B shows a view 501 of operations by core 500 to restore state of a micro-operation cache according to an embodiment. View 501 illustrates one example of an embodiment wherein the ISA of core 500 further supports the execution of another instruction to restore microarchitectural state such as that which is saved by execution of the decoded Checkptucache instruction 526. Operations such as those illustrated by view 501 are performed, for example, according to method 200, in some embodiments.

As shown in FIG. 5B, execution of another new instruction (referred to herein as a "Restoreucache" instruction) restores microarchitectural state of micro-operation cache 520 from region 542 of memory 540. In an illustrative scenario according to one embodiment, the Restoreucache instruction is fetched and decoded, with IFQ 512 and ID 524, to generate a decoded Restoreucache instruction 527 which is then provided to EXE 564. In executing the decoded Restoreucache instruction 527, EXE 564 directly or indirectly signals a repository-such as the illustrative memory 540 shown-to participate in, or otherwise enable, a communication 518 of microarchitectural state which is restored from region 542 to micro-operation cache 520 (e.g., after the microarchitectural state is decompressed, in some embodiments). In various embodiments, EXE 564 variously executes Checkptucache instructions and Restoreucache instructions on a per-thread basis.

Figure 6A:
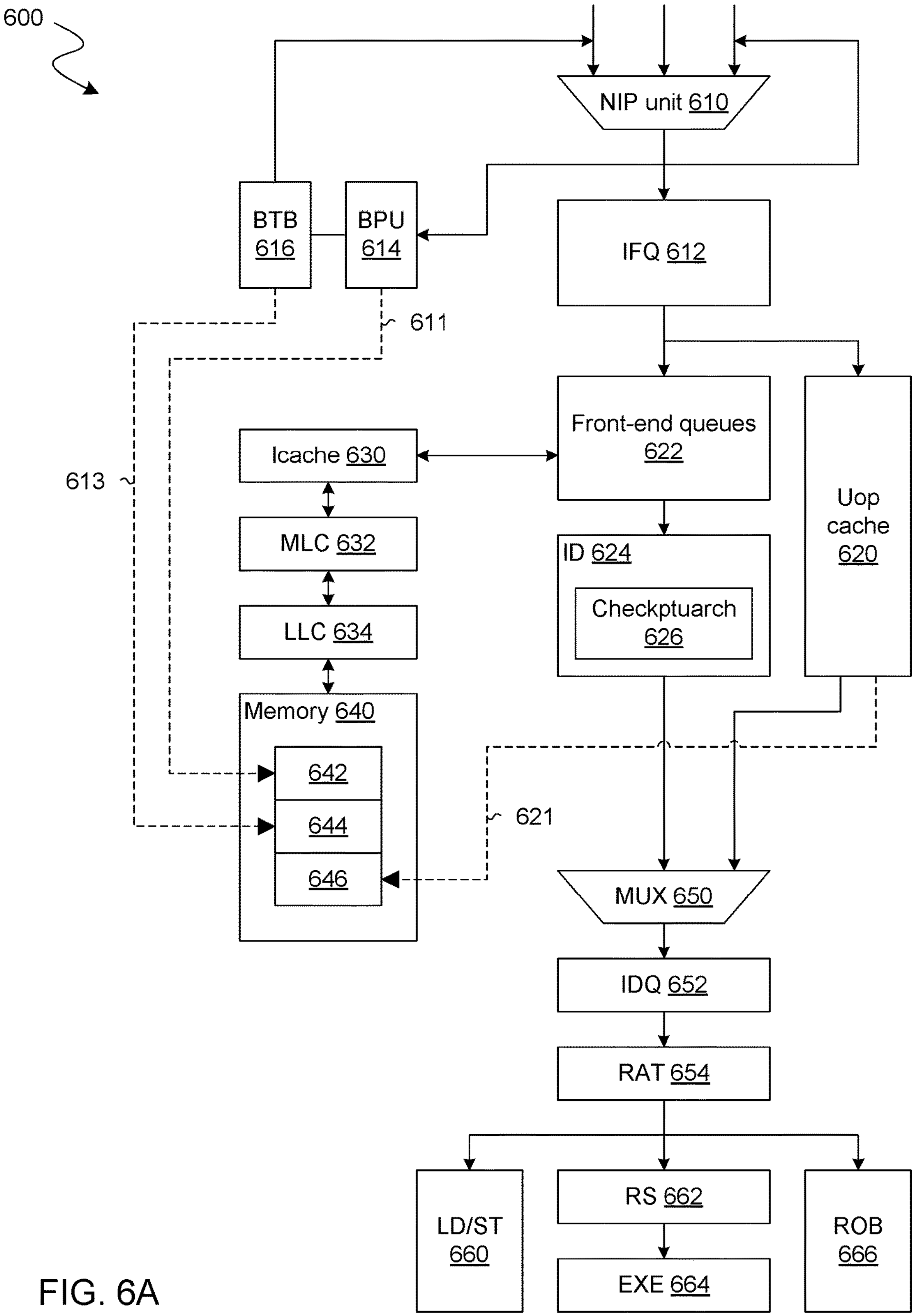
FIGS. 6A, 6B show functional block diagrams each illustrating respective operations by a processor core to capture or restore state of multiple core components according to a corresponding embodiment.

FIG. 6A shows features of a core 600 to capture state of multiple core components according to an embodiment. Core 600 illustrates one example of an embodiment which comprises an ISA that supports the execution of an instruction to save microarchitectural state of various IP blocks. In various embodiments, core 600 provides functionality such as that of processor 100, or of one of cores 300, 400, 500-e.g., wherein one or more operations of method 200 are performed with core 600.

As shown in FIG. 6A, core 600 comprises a next instruction pointer (NIP) unit 610, an instruction fetch queue (IFQ) 612, a micro-operation (uop) cache 620, front-end queues 622, and an instruction decoder (ID) 624 which, for example, correspond functionally to NIP unit 310, IFQ 312, uop cache 320, front-end queues 322, and ID 324 (respectively). Furthermore, core 600 comprises a merge multiplexer (MUX) 650, an instruction decode queue (IDQ) 652, a register alias table (RAT) 654, a load/store unit (LD/ST) 660, a reservation station (RS) 662, one or more execution units (EXE) 664, and a reorder buffer (ROB) 666 which, for example, correspond functionally to MUX 350, IDQ 352, RAT 354, LD/ST 360, RS 362, EXE 364, ROB 366 (respectively). Further still, a branch prediction unit (BPU) 614, and a branch target buffer (BTB) 616 of core 600 provide functionality of BPU 314, and BTB 316 (respectively)-e.g., wherein an instruction cache (Icache) 630, a mid-level cache (MLC) 632, a last level cache (LLC) 634, and a memory 640 of core 600 correspond functionally to Icache 330, MLC 332, LLC 334, and memory 340 (respectively).

FIG. 6A shows execution of another new instruction (referred to herein as a "Checkptuarch" instruction) which saves microarchitectural state of multiple components of a processor core. In an embodiment, the multiple components include includes some or all of a BTB, a BPU, a micro-operation cache and/or any of various other resources of a processor core according to an embodiment. In an illustrative scenario according to one embodiment, a Checkptuarch instruction is fetched and decoded, with IFQ 612 and ID 624 of core 600, to generate a decoded Checkptuarch instruction 626 which is subsequently provided to execution circuitry of the processor core.

In executing the decoded Checkptuarch instruction 626, EXE 664 directly or indirectly signals multiple components of the core to perform checkpointing that saves at least some current microarchitectural state to a repository (such as the illustrative memory 640 shown). By way of illustration and not limitation, EXE 664 signals BPU 614 to participate in a communication 611 that saves at least some current BPU state to the illustrative region 642 shown. Alternatively or in addition, EXE 664 signals BTB 616 to participate in a communication 613 that saves at least some current BTB state to the illustrative region 644 shown. Alternatively or in addition, EXE 664 signals uop cache 620 to participate in a communication 621 that saves at least some current micro-operation cache state to the illustrative region 646 shown. In some embodiments, checkpointing additionally or alternatively saves some or all microarchitectural state to one or more caches, such as one of MLC 632 or LLC 634. Although some embodiments are not limited in this regard, some or all of the microarchitectural state is compressed, prior to being saved to the repository, as part of the checkpointing which is performed by execution of the Checkptuarch instruction.

Figure 6B:
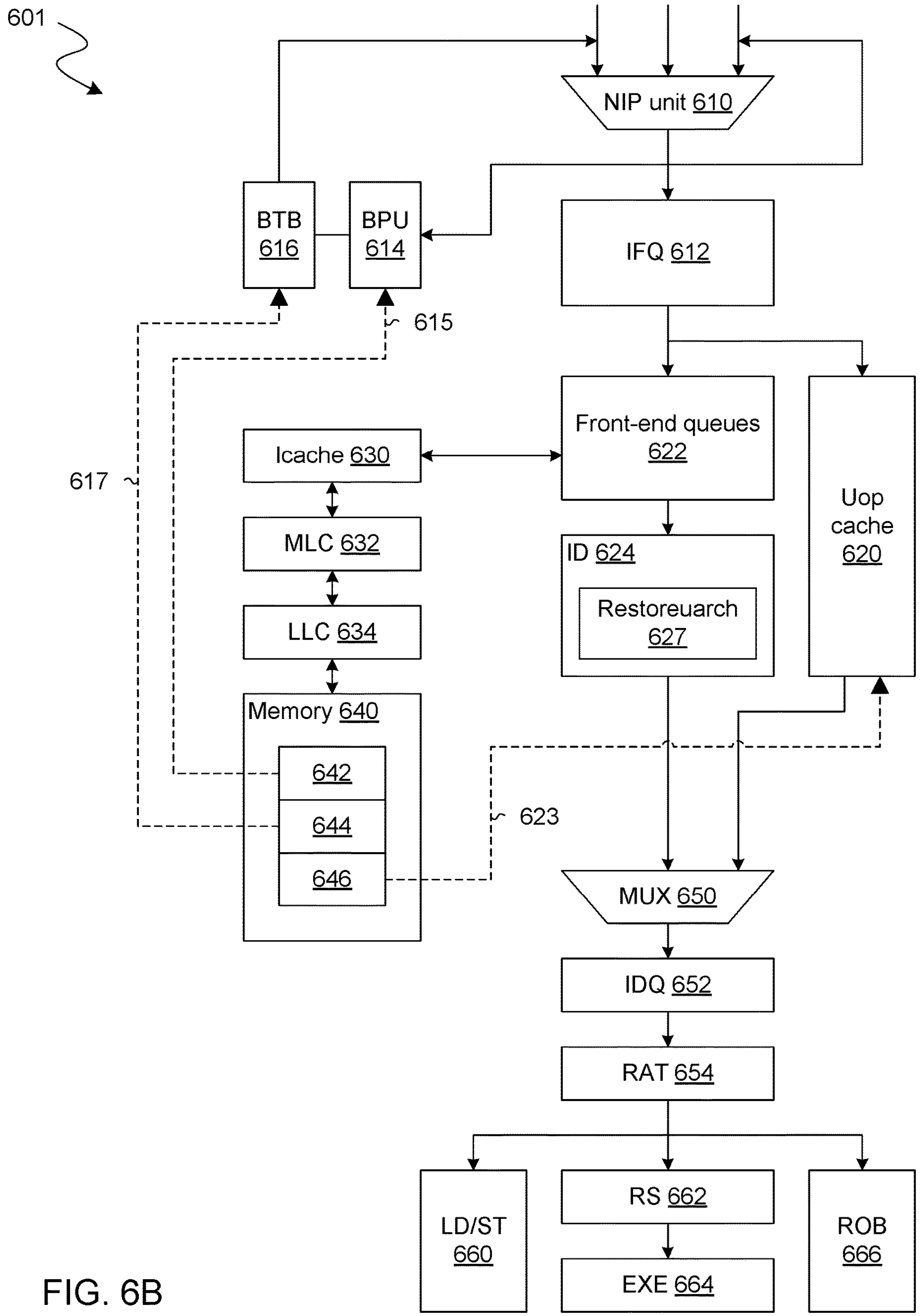

FIG. 6B shows a view 601 of operations by core 600 to restore the respective states of multiple core components according to an embodiment. View 601 illustrates one example of an embodiment wherein the ISA of core 600 further supports the execution of another instruction to restore microarchitectural state such as that which is saved by execution of the decoded Checkptuarch instruction 626. Operations such as those illustrated by view 601 are performed, for example, according to method 200, in some embodiments.

As shown in FIG. 6B, execution of another new instruction (referred to herein as a "Restoreuarch" instruction) restores microarchitectural state to multiple components of core 600-e.g., wherein the multiple components include two or more of BPU 614, BTB 616, or uop cache 620 (for example). BPU 614 from region 642 of memory 640. In an illustrative scenario according to one embodiment, the Restoreuarch instruction is fetched and decoded, with IFQ 612 and ID 624, to generate a decoded Restoreuarch instruction 627 which is then provided to EXE 664. In executing the decoded Restoreuarch instruction 627, EXE 664 directly or indirectly signals a repository-such as the illustrative memory 640 shown-to participate in, or otherwise enable, a communication 615 of microarchitectural state which is restored from region 642 to BPU 614 (e.g., after the microarchitectural state is decompressed, in some embodiments). Furthermore, execution of the decoded Restoreuarch instruction 627 includes or otherwise results in a communication 617 of microarchitectural state which is restored from region 644 to BTB 616. Further still, execution of the decoded Restoreuarch instruction 627 includes or otherwise results in a communication 623 of microarchitectural state which is restored from region 646 to uop cache 620. In various embodiments, EXE 664 variously executes Checkptuarch instructions and Restoreuarch instructions on a per-thread basis.

Figure 7:
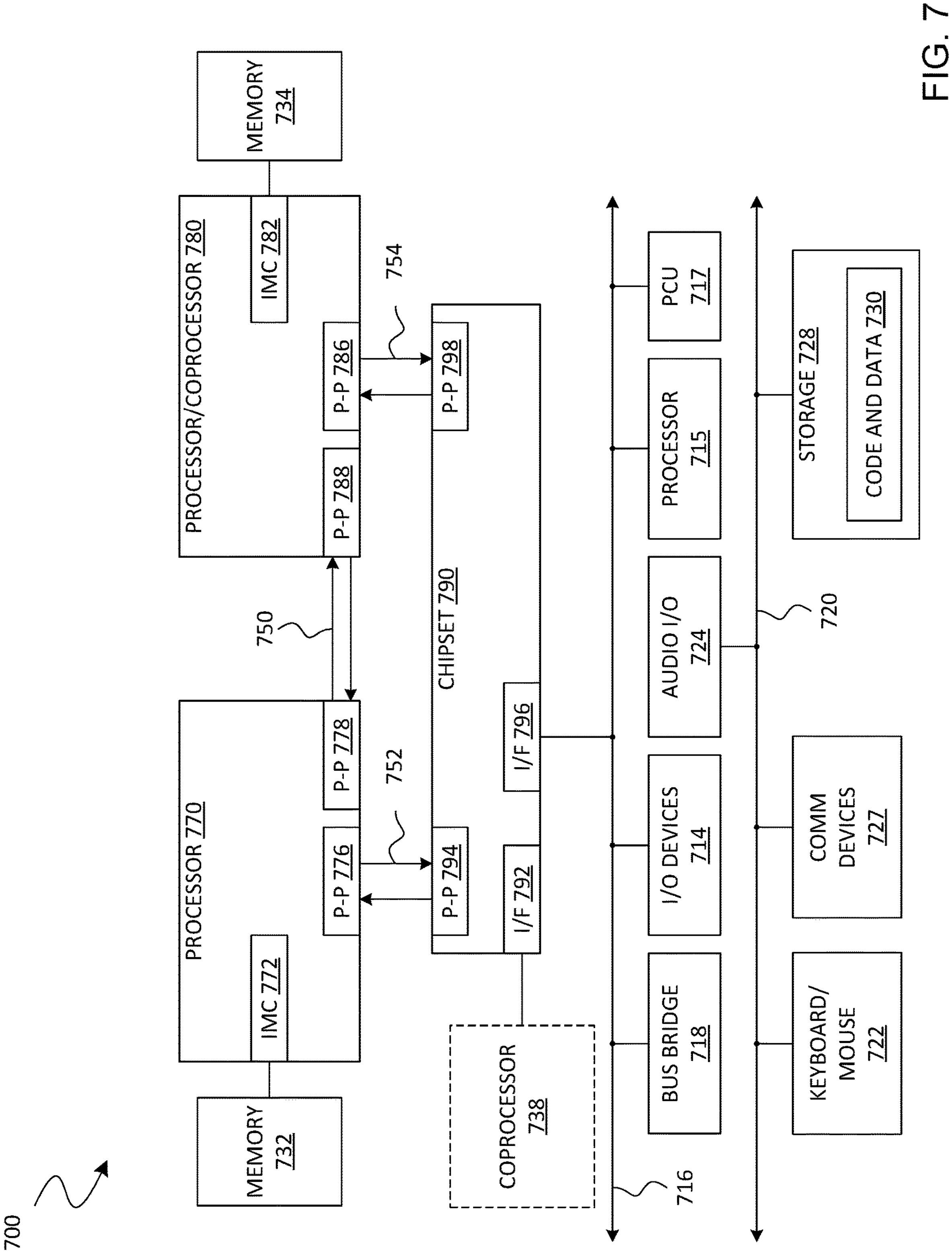
FIG. 7 illustrates an exemplary system.

FIG. 7 illustrates an exemplary system. Multiprocessor system 700 is a point-to-point interconnect system and includes a plurality of processors including a first processor 770 and a second processor 780 coupled via a point-to-point interconnect 750. In some examples, the first processor 770 and the second processor 780 are homogeneous. In some examples, first processor 770 and the second processor 780 are heterogenous. Though the exemplary system 700 is shown to have two processors, the system may have three or more processors, or may be a single processor system.

Processors 770 and 780 are shown including integrated memory controller (IMC) circuitry 772 and 782, respectively. Processor 770 also includes as part of its interconnect controller point-to-point (P-P) interfaces 776 and 778; similarly, second processor 780 includes P-P interfaces 786 and 788. Processors 770, 780 may exchange information via the point-to-point (P-P) interconnect 750 using P-P interface circuits 778, 788. IMCs 772 and 782 couple the processors 770, 780 to respective memories, namely a memory 732 and a memory 734, which may be portions of main memory locally attached to the respective processors.

Processors 770, 780 may each exchange information with a chipset 790 via individual P-P interconnects 752, 754 using point to point interface circuits 776, 794, 786, 798. Chipset 790 may optionally exchange information with a coprocessor 738 via an interface 792. In some examples, the coprocessor 738 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 770, 780 or outside of both processors, yet connected with the processors via P-P interconnect, such that either or both processors' local cache information may be stored in the shared cache if a processor is placed into a low power mode.

Chipset 790 may be coupled to a first interconnect 716 via an interface 796. In some examples, first interconnect 716 may be a Peripheral Component Interconnect (PCI) interconnect, or an interconnect such as a PCI Express interconnect or another I/O interconnect. In some examples, one of the interconnects couples to a power control unit (PCU) 717, which may include circuitry, software, and/or firmware to perform power management operations with regard to the processors 770, 780 and/or co-processor 738. PCU 717 provides control information to a voltage regulator (not shown) to cause the voltage regulator to generate the appropriate regulated voltage. PCU 717 also provides control information to control the operating voltage generated. In various examples, PCU 717 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 717 is illustrated as being present as logic separate from the processor 770 and/or processor 780. In other cases, PCU 717 may execute on a given one or more of cores (not shown) of processor 770 or 780. In some cases, PCU 717 may be implemented as a microcontroller (dedicated or general-purpose) or other control logic configured to execute its own dedicated power management code, sometimes referred to as P-code. In yet other examples, power management operations to be performed by PCU 717 may be implemented externally to a processor, such as by way of a separate power management integrated circuit (PMIC) or another component external to the processor. In yet other examples, power management operations to be performed by PCU 717 may be implemented within BIOS or other system software.

Various I/O devices 714 may be coupled to first interconnect 716, along with a bus bridge 718 which couples first interconnect 716 to a second interconnect 720. In some examples, one or more additional processor(s) 715, such as coprocessors, high-throughput many integrated core (MIC) processors, GPGPUs, accelerators (such as graphics accelerators or digital signal processing (DSP) units), field programmable gate arrays (FPGAs), or any other processor, are coupled to first interconnect 716. In some examples, second interconnect 720 may be a low pin count (LPC) interconnect. Various devices may be coupled to second interconnect 720 including, for example, a keyboard and/or mouse 722, communication devices 727 and a storage circuitry 728. Storage circuitry 728 may be one or more non-transitory machine-readable storage media as described below, such as a disk drive or other mass storage device which may include instructions/code and data 730 and may implement the storage 103 in some examples. Further, an audio I/O 724 may be coupled to second interconnect 720. Note that other architectures than the point-to-point architecture described above are possible. For example, instead of the point-topoint architecture, a system such as multiprocessor system 700 may implement a multi-drop interconnect or other such architecture.

Exemplary Core Architectures, Processors, and Computer Architectures.

Processor cores may be implemented in different ways, for different purposes, and in different processors. For instance, implementations of such cores may include: 1) a gene purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 8:
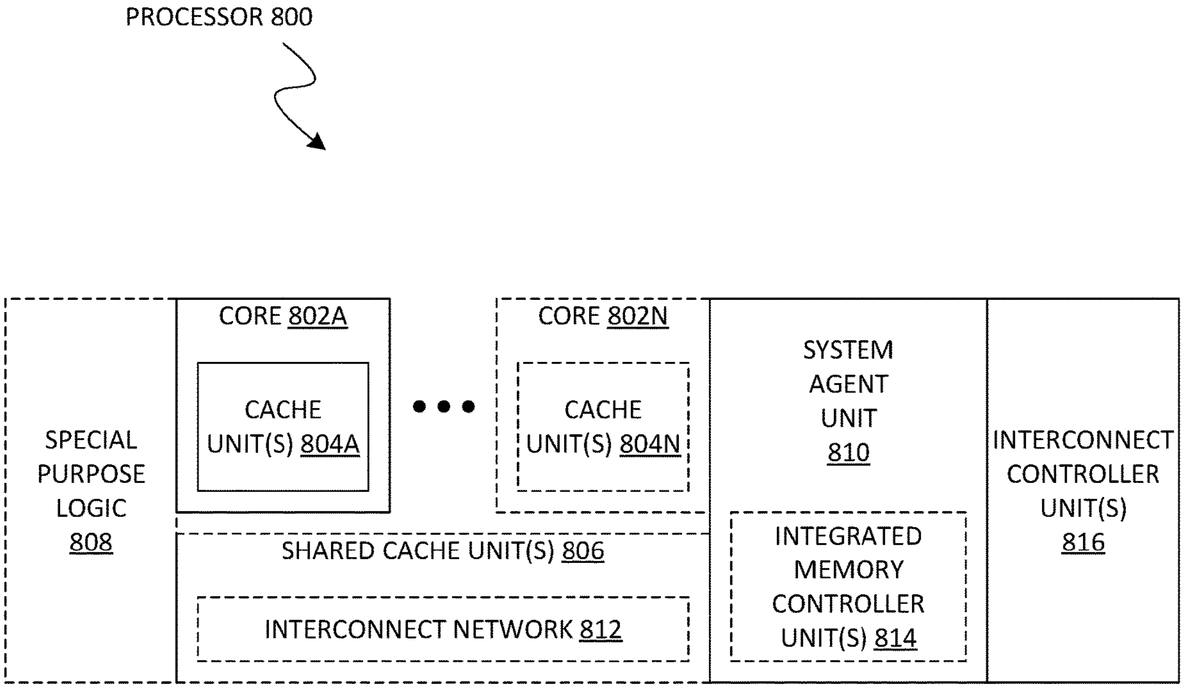
FIG. 8 illustrates a block diagram of an example processor that may have more than one core and an integrated memory controller.

FIG. 8 illustrates a block diagram of an example processor 800 that may have more than one core and an integrated memory controller. The solid lined boxes illustrate a processor 800 with a single core 802A, a system agent unit circuitry 810, a set of one or more interconnect controller unit(s) circuitry 816, while the optional addition of the dashed lined boxes illustrates an alternative processor 800 with multiple cores 802A-N, a set of one or more integrated memory controller unit(s) circuitry 814 in the system agent unit circuitry 810, and special purpose logic 808, as well as a set of one or more interconnect controller units circuitry 816. Note that the processor 800 may be one of the processors 770 or 780, or co-processor 738 or 715 of FIG. 7.

Thus, different implementations of the processor 800 may include: 1) a CPU with the special purpose logic 808 being integrated graphics and/or scientific (throughput) logic (which may include one or more cores, not shown), and the cores 802A-N being one or more general purpose cores (e.g., general purpose in-order cores, general purpose out-of-order cores, or a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 804A-N within the cores 802A-N, a set of one or more shared cache unit(s) circuitry 806, and external memory (not shown) coupled to the set of integrated memory controller unit(s) circuitry 814. The set of one or more shared cache unit(s) circuitry 806 may include one or more mid-level caches, such as level 2 (L2), level 3 (L3), level 4 (L4), or other levels of cache, such as a last level cache (LLC), and/or combinations thereof. While in some examples ring-based interconnect network circuitry 812 interconnects the special purpose logic 808 (e.g., integrated graphics logic), the set of shared cache unit(s) circuitry 806, and the system agent unit circuitry 810, alternative examples use any number of well-known techniques for interconnecting such units. In some examples, coherency is maintained between one or more of the shared cache unit(s) circuitry 806 and cores 802A-N.

In some examples, one or more of the cores 802A-N are capable of multi-threading. The system agent unit circuitry 810 includes those components coordinating and operating cores 802A-N. The system agent unit circuitry 810 may include, for example, power control unit (PCU) circuitry and/or display unit circuitry (not shown). The PCU may be or may include logic and components needed for regulating the power state of the cores 802A-N and/or the special purpose logic 808 (e.g., integrated graphics logic). The display unit circuitry is for driving one or more externally connected displays.

The cores 802A-N may be homogenous in terms of instruction set architecture (ISA). Alternatively, the cores 802A-N may be heterogeneous in terms of ISA; that is, a subset of the cores 802A-N may be capable of executing an ISA, while other cores may be capable of executing only a subset of that ISA or another ISA.

Exemplary Core Architectures-In-Order and Out-of-Order Core Block Diagram.

FIG. 9A is a block diagram illustrating both an exemplary in-order pipeline and an exemplary register renaming, out-of-order issue/execution pipeline according to examples. FIG. 9B is a block diagram illustrating both an exemplary example of an in-order architecture core and an exemplary register renaming, out-of-order issue/execution architecture core to be included in a processor according to examples. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, an optional length decoding stage 904, a decode stage 906, an optional allocation (Alloc) stage 908, an optional renaming stage 910, a schedule (also known as a dispatch or issue) stage 912, an optional register read/memory read stage 914, an execute stage 916, a write back/memory write stage 918, an optional exception handling stage 922, and an optional commit stage 924. One or more operations can be performed in each of these processor pipeline stages. For example, during the fetch stage 902, one or more instructions are fetched from instruction memory, and during the decode stage 906, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 906 and the register read/memory read stage 914 may be combined into one pipeline stage. In one example, during the execute stage 916, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution architecture core of FIG. 9B may implement the pipeline 900 as follows: 1) the instruction fetch circuitry 938 performs the fetch and length decoding stages 902 and 904; 2) the decode circuitry 940 performs the decode stage 906; 3) the rename/allocator unit circuitry 952 performs the allocation stage 908 and renaming stage 910; 4) the scheduler(s) circuitry 956 performs the schedule stage 912; 5) the physical register file(s) circuitry 958 and the memory unit circuitry 970 perform the register read/memory read stage 914; the execution cluster(s) 960 perform the execute stage 916; 6) the memory unit circuitry 970 and the physical register file(s) circuitry 958 perform the write back/memory write stage 918; 7) various circuitry may be involved in the exception handling stage 922; and 8) the retirement unit circuitry 954 and the physical register file(s) circuitry 958 perform the commit stage 924.

FIG. 9B shows a processor core 990 including front-end unit circuitry 930 coupled to an execution engine unit circuitry 950, and both are coupled to a memory unit circuitry 970. The core 990 may be a reduced instruction set architecture computing (RISC) core, a complex instruction set architecture computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit circuitry 930 may include branch prediction circuitry 932 coupled to an instruction cache circuitry 934, which is coupled to an instruction translation lookaside buffer (TLB) 936, which is coupled to instruction fetch circuitry 938, which is coupled to decode circuitry 940. In one example, the instruction cache circuitry 934 is included in the memory unit circuitry 970 rather than the front-end circuitry 930. The decode circuitry 940 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 940 may further include an address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 940 may be implemented using various different mechanisms. Examples of suitable mechanisms include, but are not limited to, look-up tables, hardware implementations, programmable logic arrays (PLAs), microcode read only memories (ROMs), etc. In one example, the core 990 includes a microcode ROM (not shown) or other medium that stores microcode for certain macroinstructions (e.g., in decode circuitry 940 or otherwise within the front end circuitry 930). In one example, the decode circuitry 940 includes a micro-operation (micro-op) or operation cache (not shown) to hold/cache decoded operations, micro-tags, or micro-operations generated during the decode or other stages of the processor pipeline 900. The decode circuitry 940 may be coupled to rename/allocator unit circuitry 952 in the execution engine circuitry 950.

The execution engine circuitry 950 includes the rename/allocator unit circuitry 952 coupled to a retirement unit circuitry 954 and a set of one or more scheduler(s) circuitry 956. The scheduler(s) circuitry 956 represents any number of different schedulers, including reservations stations, central instruction window, etc. In some examples, the scheduler(s) circuitry 956 can include arithmetic logic unit (ALU) scheduler/scheduling circuitry, ALU queues, arithmetic generation unit (AGU) scheduler/scheduling circuitry, AGU queues, etc. The scheduler(s) circuitry 956 is coupled to the physical register file(s) circuitry 958. Each of the physical register file(s) circuitry 958 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 958 includes vector registers unit circuitry, writemask registers unit circuitry, and scalar register unit circuitry. These register units may provide architectural vector registers, vector mask registers, general-purpose registers, etc. The physical register file(s) circuitry 958 is coupled to the retirement unit circuitry 954 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 954 and the physical register file(s) circuitry 958 are coupled to the execution cluster(s) 960. The execution cluster(s) 960 includes a set of one or more execution unit(s) circuitry 962 and a set of one or more memory access circuitry 964. The execution unit(s) circuitry 962 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 956, physical register file(s) circuitry 958, and execution cluster(s) 960 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster- and in the case of a separate memory access pipeline, certain examples are implemented in which only the execution cluster of this pipeline has the memory access unit(s) circuitry 964). It should also be understood that where separate pipelines are used, one or more of these pipelines may be out-of-order issue/execution and the rest in-order.

In some examples, the execution engine unit circuitry 950 may perform load store unit (LSU) address/data pipelining to an Advanced Microcontroller Bus (AMB) interface (not shown), and address phase and writeback, data phase load, store, and branches.

The set of memory access circuitry 964 is coupled to the memory unit circuitry 970, which includes data TLB circuitry 972 coupled to a data cache circuitry 974 coupled to a level 2 (L2) cache circuitry 976. In one exemplary example, the memory access circuitry 964 may include a load unit circuitry, a store address unit circuit, and a store data unit circuitry, each of which is coupled to the data TLB circuitry 972 in the memory unit circuitry 970. The instruction cache circuitry 934 is further coupled to the level 2 (L2) cache circuitry 976 in the memory unit circuitry 970. In one example, the instruction cache 934 and the data cache 974 are combined into a single instruction and data cache (not shown) in L2 cache circuitry 976, a level 3 (L3) cache circuitry (not shown), and/or main memory. The L2 cache circuitry 976 is coupled to one or more other levels of cache and eventually to a main memory.

The core 990 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 990 includes logic to support a packed data instruction set architecture extension (e.g., AVX1, AVX2), thereby allowing the operations used by many multimedia applications to be performed using packed data.

Exemplary Execution Unit(s) Circuitry.

Figure 10:
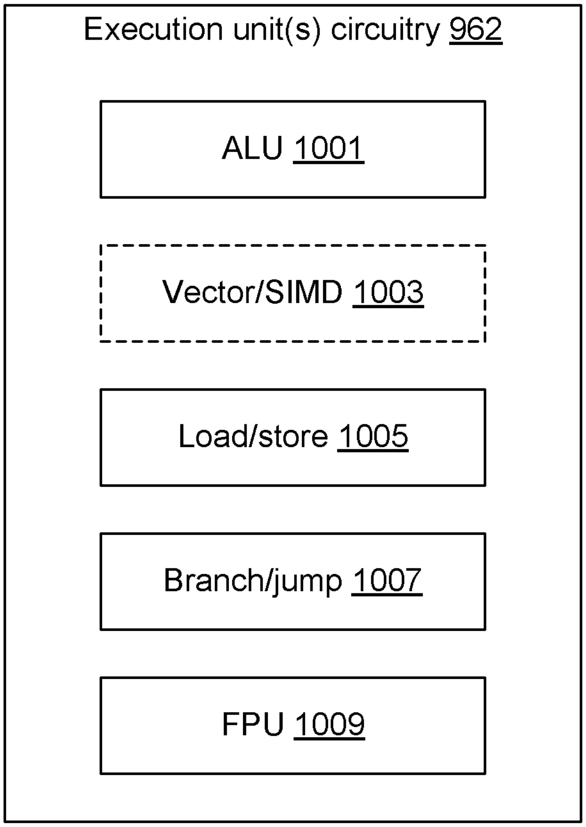
FIG. 10 illustrates examples of execution unit(s) circuitry.

FIG. 10 illustrates examples of execution unit(s) circuitry, such as execution unit(s) circuitry 962 of FIG. 9B. As illustrated, execution unit(s) circuitry 962 may include one or more ALU circuits 1001, optional vector/single instruction multiple data (SIMD) circuits 1003, load/store circuits 1005, branch/jump circuits 1007, and/or Floating-point unit (FPU) circuits 1009. ALU circuits 1001 perform integer arithmetic and/or Boolean operations. Vector/SIMD circuits 1003 perform vector/SIMD operations on packed data (such as SIMD/vector registers). Load/store circuits 1005 execute load and store instructions to load data from memory into registers or store from registers to memory. Load/store circuits 1005 may also generate addresses. Branch/jump circuits 1007 cause a branch or jump to a memory address depending on the instruction. FPU circuits 1009 perform floating-point arithmetic. The width of the execution unit(s) circuitry 962 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Exemplary Register Architecture

Figure 11:
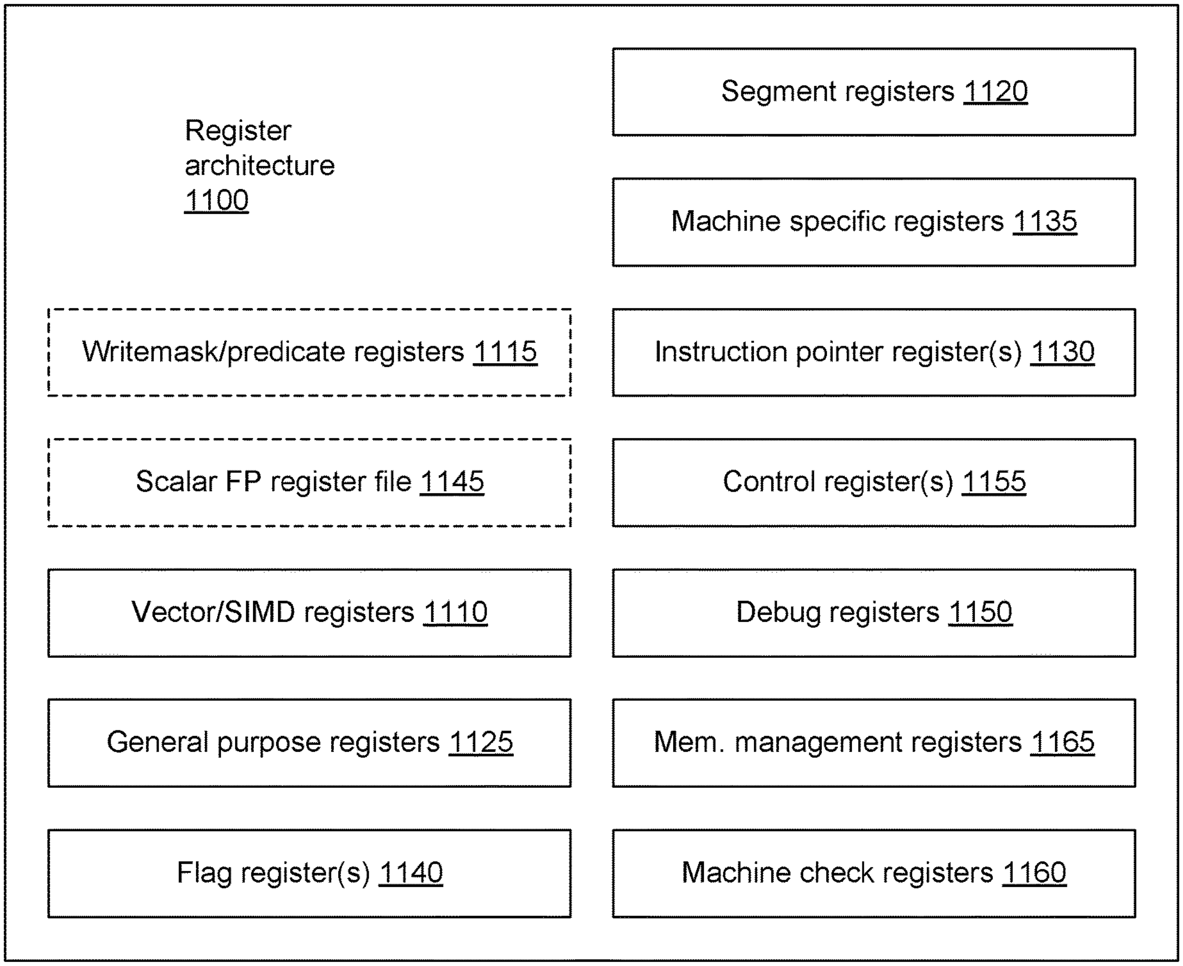
FIG. 11 is a block diagram of a register architecture according to some examples.

FIG. 11 is a block diagram of a register architecture 1100 according to some examples. As illustrated, the register architecture 1100 includes vector/SIMD registers 1110 that vary from 128-bit to 1,024 bits width. In some examples, the vector/SIMD registers 1110 are physically 512-bits and, depending upon the mapping, only some of the lower bits are used. For example, in some examples, the vector/SIMD registers 1110 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1100 includes writemask/predicate registers 1115. For example, in some examples, there are 8 writemask/predicate registers (sometimes called k0 through k7) that are each 16-bit, 32-bit, 64-bit, or 128-bit in size. Writemask/predicate registers 1115 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1115 corresponds to a data element position of the destination. In other examples, the writemask/predicate registers 1115 are scalable and consists of a set number of enable bits for a given vector element (e.g., 8 enable bits per 64-bit vector element).

The register architecture 1100 includes a plurality of general-purpose registers 1125. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1100 includes scalar floating-point (FP) register 1145 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1140 (e.g., EFLAGS, RFLAGS, etc.) store status and control information for arithmetic, compare, and system operations. For example, the one or more flag registers 1140 may store condition code information such as carry, parity, auxiliary carry, zero, sign, and overflow. In some examples, the one or more flag registers 1140 are called program status and control registers.

Segment registers 1120 contain segment points for use in accessing memory. In some examples, these registers are referenced by the names CS, DS, SS, ES, FS, and GS.

Machine specific registers (MSRs) 1135 control and report on processor performance. Most MSRs 1135 handle system-related functions and are not accessible to an application program. Machine check registers 1160 consist of control, status, and error reporting MSRs that are used to detect and report on hardware errors.

One or more instruction pointer register(s) 1130 store an instruction pointer value. Control register(s) 1155 (e.g., CR0-CR4) determine the operating mode of a processor (e.g., processor 770, 780, 738, 715, and/or 800) and the characteristics of a currently executing task. Debug registers 1150 control and allow for the monitoring of a processor or core's debugging operations.

Memory (mem) management registers 1165 specify the locations of data structures used in protected mode memory management. These registers may include a GDTR, IDRT, task register, and a LDTR register.

Alternative examples may use wider or narrower registers. Additionally, alternative examples may use more, less, or different register files and registers. The register architecture 1100 may, for example, be used in register file/memory 108, or physical register file(s) circuitry 9 58.

Instruction Set Architectures.

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source 1/destination and source2); and an occurrence of this ADD instruction in an instruction stream will have specific contents in the operand fields that select specific operands. In addition, though the description below is made in the context of x86 ISA, it is within the knowledge of one skilled in the art to apply the teachings of the present disclosure in another ISA.

Exemplary Instruction Formats.

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

Figure 12:
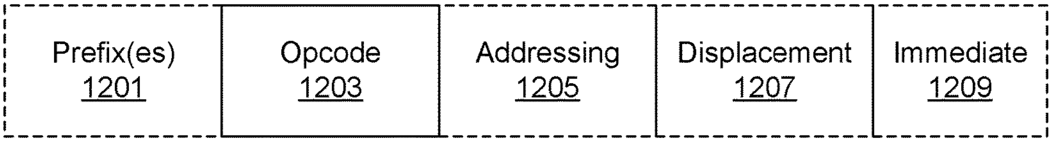
FIG. 12 illustrates examples of an instruction format.

FIG. 12 illustrates examples of an instruction format. As illustrated, an instruction may include multiple components including, but not limited to, one or more fields for: one or more prefixes 1201, an opcode 1203, addressing information 1205 (e.g., register identifiers, memory addressing information, etc.), a displacement value 1207, and/or an immediate value 1209. Note that some instructions utilize some or all of the fields of the format whereas others may only use the field for the opcode 1203. In some examples, the order illustrated is the order in which these fields are to be encoded, however, it should be appreciated that in other examples these fields may be encoded in a different order, combined, etc.

The prefix(es) field(s) 1201, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1203 is used to at least partially define the operation to be performed upon a decoding of the instruction. In some examples, a primary opcode encoded in the opcode field 1203 is one, two, or three bytes in length. In other examples, a primary opcode can be a different length. An additional 3-bit opcode field is sometimes encoded in another field.

Figure 13:
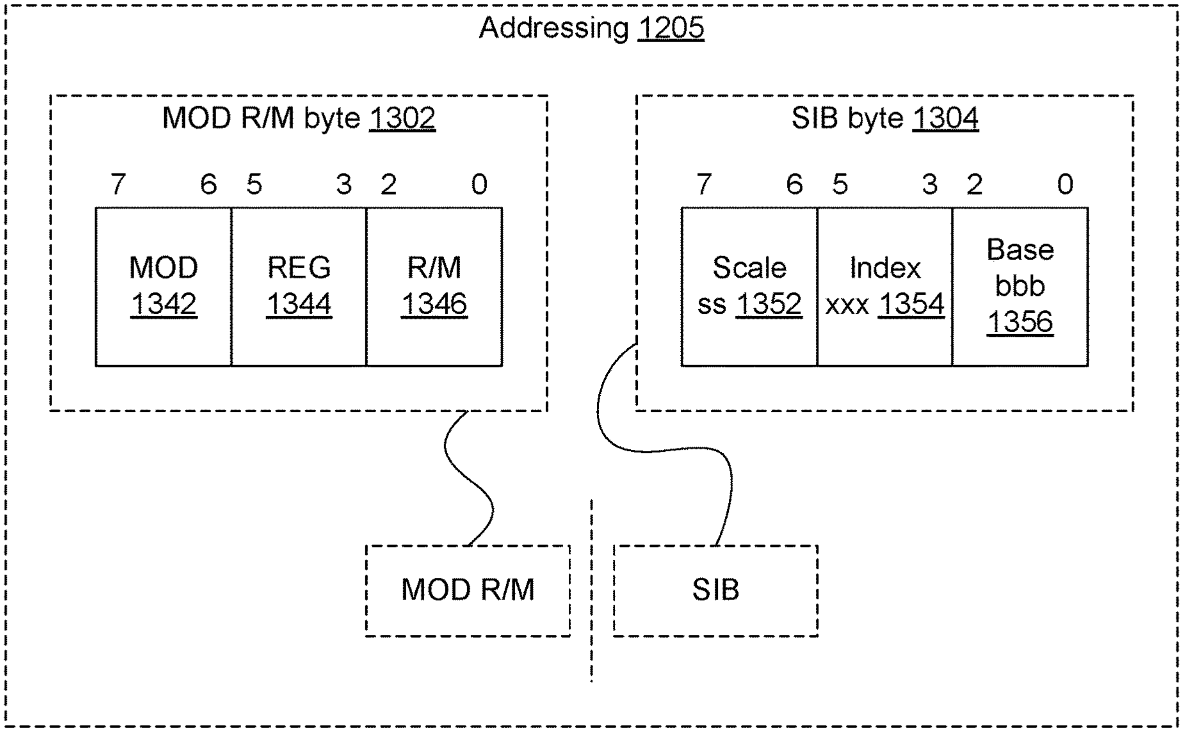
FIG. 13 illustrates examples of an addressing field.

The addressing field 1205 is used to address one or more operands of the instruction, such as a location in memory or one or more registers. FIG. 13 illustrates examples of the addressing field 1205. In this illustration, an optional ModR/M byte 1302 and an optional Scale, Index, Base (SIB) byte 1304 are shown. The ModR/M byte 1302 and the SIB byte 1304 are used to encode up to two operands of an instruction, each of which is a direct register or effective memory address. Note that each of these fields are optional in that not all instructions include one or more of these fields. The MOD R/M byte 1302 includes a MOD field 1342, a register (reg) field 1344, and R/M field 1346.

The content of the MOD field 1342 distinguishes between memory access and non-memory access modes. In some examples, when the MOD field 1342 has a binary value of 11 (11*b*), a register-direct addressing mode is utilized, and otherwise register-indirect addressing is used.

The register field 1344 may encode either the destination register operand or a source register operand, or may encode an opcode extension and not be used to encode any instruction operand. The content of register index field 1344, directly or through address generation, specifies the locations of a source or destination operand (either in a register or in memory). In some examples, the register field 1344 is supplemented with an additional bit from a prefix (e.g., prefix 1201) to allow for greater addressing.

The R/M field 1346 may be used to encode an instruction operand that references a memory address or may be used to encode either the destination register operand or a source register operand. Note the R/M field 1346 may be combined with the MOD field 1342 to dictate an addressing mode in some examples.

The SIB byte 1304 includes a scale field 1352, an index field 1354, and a base field 1356 to be used in the generation of an address. The scale field 1352 indicates scaling factor. The index field 1354 specifies an index register to use. In some examples, the index field 1354 is supplemented with an additional bit from a prefix (e.g., prefix 1201) to allow for greater addressing. The base field 1356 specifies a base register to use. In some examples, the base field 1356 is supplemented with an additional bit from a prefix (e.g., prefix 1201) to allow for greater addressing. In practice, the content of the scale field 1352 allows for the scaling of the content of the index field 1354 for memory address generation (e.g., for address generation that uses 2 scale*index+base).

Some addressing forms utilize a displacement value to generate a memory address. For example, a memory address may be generated according to 2 scale*index+base+displacement, index*scale+displacement, r/m+displacement, instruction pointer (RIP/EIP)+displacement, register+displacement, etc. The displacement may be a 1-byte, 2-byte, 4-byte, etc. value. In some examples, a displacement 1207 provides this value. Additionally, in some examples, a displacement factor usage is encoded in the MOD field of the addressing field 1205 that indicates a compressed displacement scheme for which a displacement value is calculated and stored in the displacement field 1207.

In some examples, an immediate field 1209 specifies an immediate value for the instruction. An immediate value may be encoded as a 1-byte value, a 2-byte value, a 4-byte value, etc.

Figure 14:
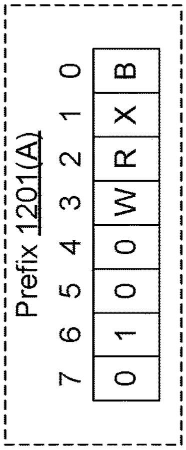
FIG. 14 illustrates examples of a first prefix.

FIG. 14 illustrates examples of a first prefix 1201(A). In some examples, the first prefix 1201(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1201(A) may specify up to three registers using 3-bit fields depending on the format: 1) using the reg field 1344 and the R/M field 1346 of the Mod R/M byte 1302; 2) using the Mod R/M byte 1302 with the SIB byte 1304 including using the reg field 1344 and the base field 1356 and index field 1354; or 3) using the register field of an opcode.

In the first prefix 1201(A), bit positions 7:4 are set as 0100. Bit position 3(W) can be used to determine the operand size but may not solely determine operand width. As such, when W=0, the operand size is determined by a code segment descriptor (CS.D) and when W=1, the operand size is 64-bit.

Note that the addition of another bit allows for 16 (24) registers to be addressed, whereas the MOD R/M reg field 1344 and MOD R/M R/M field 1346 alone can each only address 8 registers.

In the first prefix 1201(A), bit position 2(R) may be an extension of the MOD R/M reg field 1344 and may be used to modify the ModR/M reg field 1344 when that field encodes a general-purpose register, a 64-bit packed data register (e.g., a SSE register), or a control or debug register. R is ignored when Mod R/M byte 1302 specifies other registers or defines an extended opcode.

Bit position 1(X) may modify the SIB byte index field 1354.

Bit position 0(B) may modify the base in the Mod R/M R/M field 1346 or the SIB byte base field 1356; or it may modify the opcode register field used for accessing general purpose registers (e.g., general purpose registers 1125).

Figure 15A:
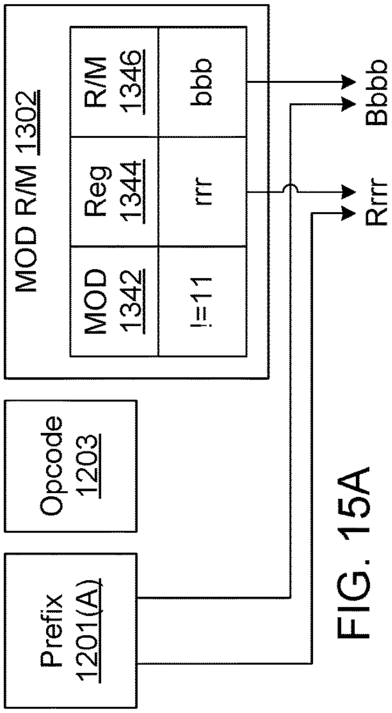
FIGS. 15A-D illustrate examples of how the R, X, and B fields of the first prefix in FIG. 14 are used.
Figure 15B:
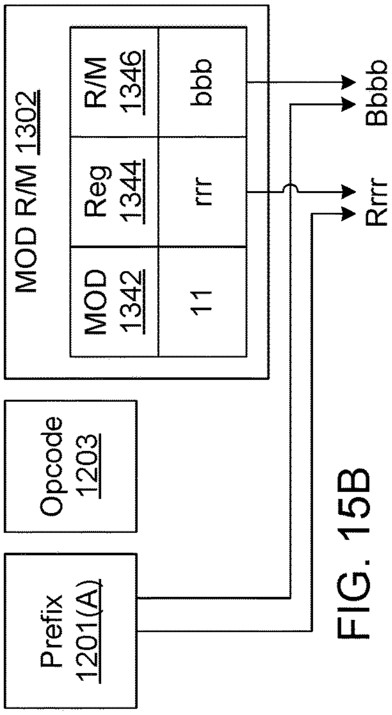
Figure 15C:
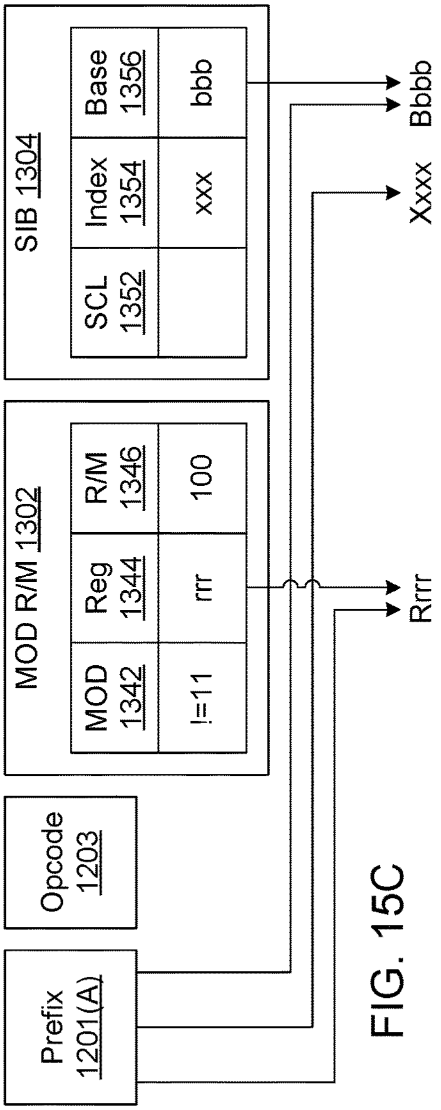
Figure 15D:
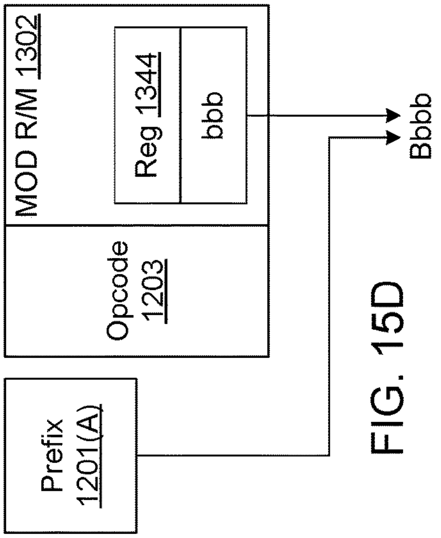

FIGS. 15A-D illustrate examples of how the R, X, and B fields of the first prefix 1201(A) are used. FIG. 15A illustrates R and B from the first prefix 1201(A) being used to extend the reg field 1344 and R/M field 1346 of the MOD R/M byte 1302 when the SIB byte 13 04 is not used for memory addressing. FIG. 15B illustrates R and B from the first prefix 1201(A) being used to extend the reg field 1344 and R/M field 1346 of the MOD R/M byte 1302 when the SIB byte 13 04 is not used (register-register addressing). FIG. 15C illustrates R, X, and B from the first prefix 1201(A) being used to extend the reg field 1344 of the MOD R/M byte 1302 and the index field 1354 and base field 1356 when the SIB byte 13 04 being used for memory addressing. FIG. 15D illustrates B from the first prefix 1201(A) being used to extend the reg field 1344 of the MOD R/M byte 1302 when a register is encoded in the opcode 1203.

Figure 16A:
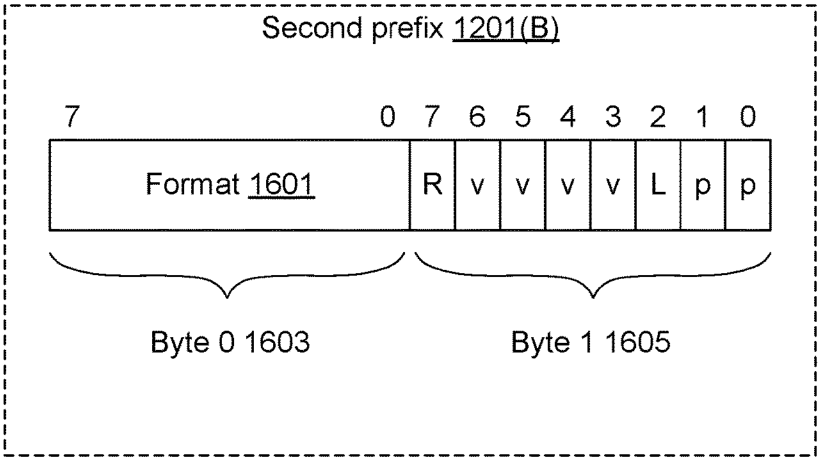
FIGS. 16A-B illustrate examples of a second prefix.
Figure 16B:
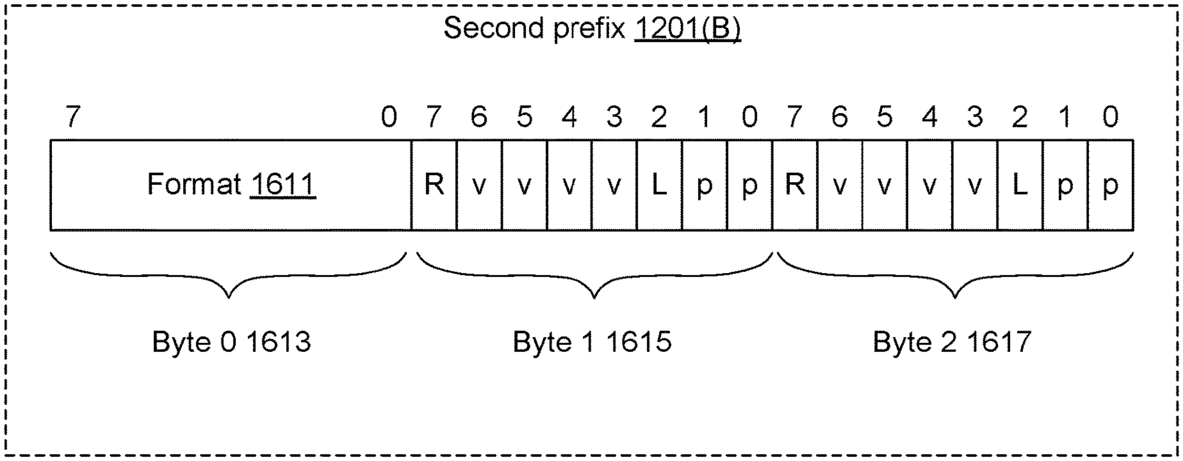

FIGS. 16A-B illustrate examples of a second prefix 1201 (B). In some examples, the second prefix 1201(B) is an example of a VEX prefix. The second prefix 1201(B) encoding allows instructions to have more than two operands, and allows SIMD vector registers (e.g., vector/SIMD registers 1110) to be longer than 64-bits (e.g., 128-bit and 256-bit). The use of the second prefix 1201(B) provides for three-operand (or more) syntax. For example, previous two-operand instructions performed operations such as A=A+B, which overwrites a source operand. The use of the second prefix 1201(B) enables operands to perform nondestructive operations such as A=B+C.

In some examples, the second prefix 1201(B) comes in two forms-a two-byte form and a three-byte form. The two-byte second prefix 1201(B) is used mainly for 128-bit, scalar, and some 256-bit instructions; while the three-byte second prefix 1201(B) provides a compact replacement of the first prefix 1201(A) and 3-byte opcode instructions.

FIG. 16A illustrates examples of a two-byte form of the second prefix 1201(B). In one example, a format field 1601 (byte 0 1603) contains the value C5H. In one example, byte 1 1605 includes a "R" value in bit[7]. This value is the complement of the "R" value of the first prefix 1201(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111*b*.

Instructions that use this prefix may use the Mod R/M R/M field 1346 to encode the instruction operand that references a memory address or encode either the destination register operand or a source register operand.

Instructions that use this prefix may use the Mod R/M reg field 1344 to encode either the destination register operand or a source register operand, be treated as an opcode extension and not used to encode any instruction operand.

For instruction syntax that support four operands, vvvv, the Mod R/M R/M field 1346 and the Mod R/M reg field 1344 encode three of the four operands. Bits[7:4] of the immediate 1209 are then used to encode the third source register operand.

FIG. 16B illustrates examples of a three-byte form of the second prefix 1201(B). In one example, a format field 1611 (byte 0 1613) contains the value C4H. Byte 1 1615 includes in bits [7:5] "R," "X," and "B" which are the complements of the same values of the first prefix 1201(A). Bits[4:0] of byte 1 1615 (shown as mmmmm) include content to encode, as need, one or more implied leading opcode bytes. For example, 00001 implies a OFH leading opcode, 00010 implies a OF38H leading opcode, 00011 implies a leading OF3AH opcode, etc.

Bit[7] of byte 2 1617 is used similar to W of the first prefix 1201(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111*b*.

Instructions that use this prefix may use the Mod R/M R/M field 1346 to encode the instruction operand that references a memory address or encode either the destination register operand or a source register operand.

Instructions that use this prefix may use the Mod R/M reg field 1344 to encode either the destination register operand or a source register operand, be treated as an opcode extension and not used to encode any instruction operand.

For instruction syntax that support four operands, vvvv, the Mod R/M R/M field 1346, and the Mod R/M reg field 1344 encode three of the four operands. Bits[7:4] of the immediate 1209 are then used to encode the third source register operand.

Figure 17:
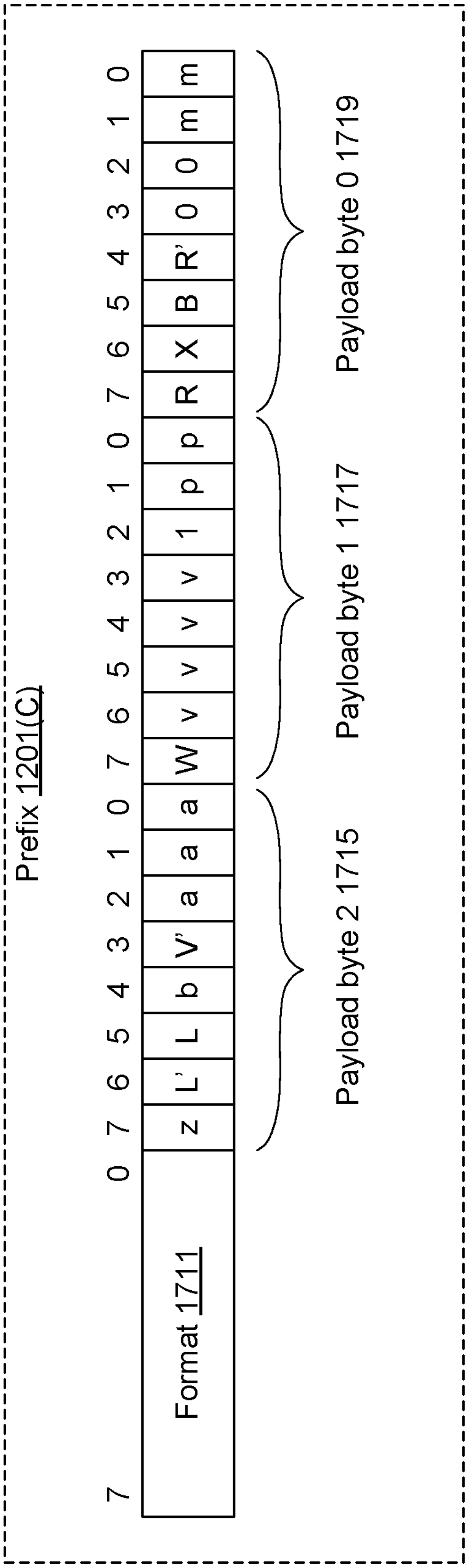
FIG. 17 illustrates examples of a third prefix.

FIG. 17 illustrates examples of a third prefix 1201(C). In some examples, the first prefix 1201(A) is an example of an EVEX prefix. The third prefix 1201(C) is a four-byte prefix.

The third prefix 1201(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 11) or predication utilize this prefix. Opmask register allow for conditional processing or selection control. Opmask instructions, whose source/destination operands are opmask registers and treat the content of an opmask register as a single value, are encoded using the second prefix 1201(B).

The third prefix 1201(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1201(C) is a format field 1711 that has a value, in one example, of 62H. Subsequent bytes are referred to as payload bytes 1715-1719 and collectively form a 24-bit value of P[23:0] providing specific capability in the form of one or more fields (detailed herein).

In some examples, P[1:0] of payload byte 1719 are identical to the low two mmmmm bits. P[3:2] are reserved in some examples. Bit P[4] (R') allows access to the high 16 vector register set when combined with P[7] and the ModR/M reg field 1344. P[6] can also provide access to a high 16 vector register when SIB-type addressing is not needed. P[7:5] consist of an R. X, and B which are operand specifier modifier bits for vector register, general purpose register, memory addressing and allow access to the next set of 8 registers beyond the low 8 registers when combined with the ModR/M register field 1344 and ModR/M R/M field 1346. P[9:8] provide opcode extensionality equivalent to some legacy prefixes (e.g., 00=no prefix, 01 =66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111*b*.

P[15] is similar to W of the first prefix 1201(A) and second prefix 1201(B) and may serve as an opcode extension bit or operand size promotion.

P[18:16] specify the index of a register in the opmask (writemask) registers (e.g., writemask/predicate registers 1115). In one example, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary examples of encoding of registers in instructions using the third prefix 1201(C) are detailed in the following tables.

TABLE 1

32-Register Support in 64-bit Mode

| | 4 | 3 | [2:0] | REG. TYPE | COMMON USAGES |
|---|---|---|---|---|---|
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

| | [2:0] | REG. TYPE | COMMON USAGES |
|---|---|---|---|
| REG | ModR/M reg | GPR, Vector | Destination or Source |
| VVVV | vvvv | GPR, Vector | 2nd Source or Destination |
| RM | ModR/M R/M | GPR, Vector | 1st Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

| | [2:0] | REG. TYPE | COMMON USAGES |
|---|---|---|---|
| REG | ModR/M Reg | k0-k7 | Source |
| VVVV | vvvv | k0-k7 | 2nd Source |

TABLE 3-continued

| Opmask Register Specifier Encoding | | | |
| --- | --- | --- | --- |
| | [2:0] | REG. TYPE | COMMON USAGES |
| RM | ModR/M R/M | k0-k7 | 1st Source |
| {k1} | aaa | k0-k7 | Opmask |

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products. Emulation (Including Binary Translation, Code Morphing, Etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
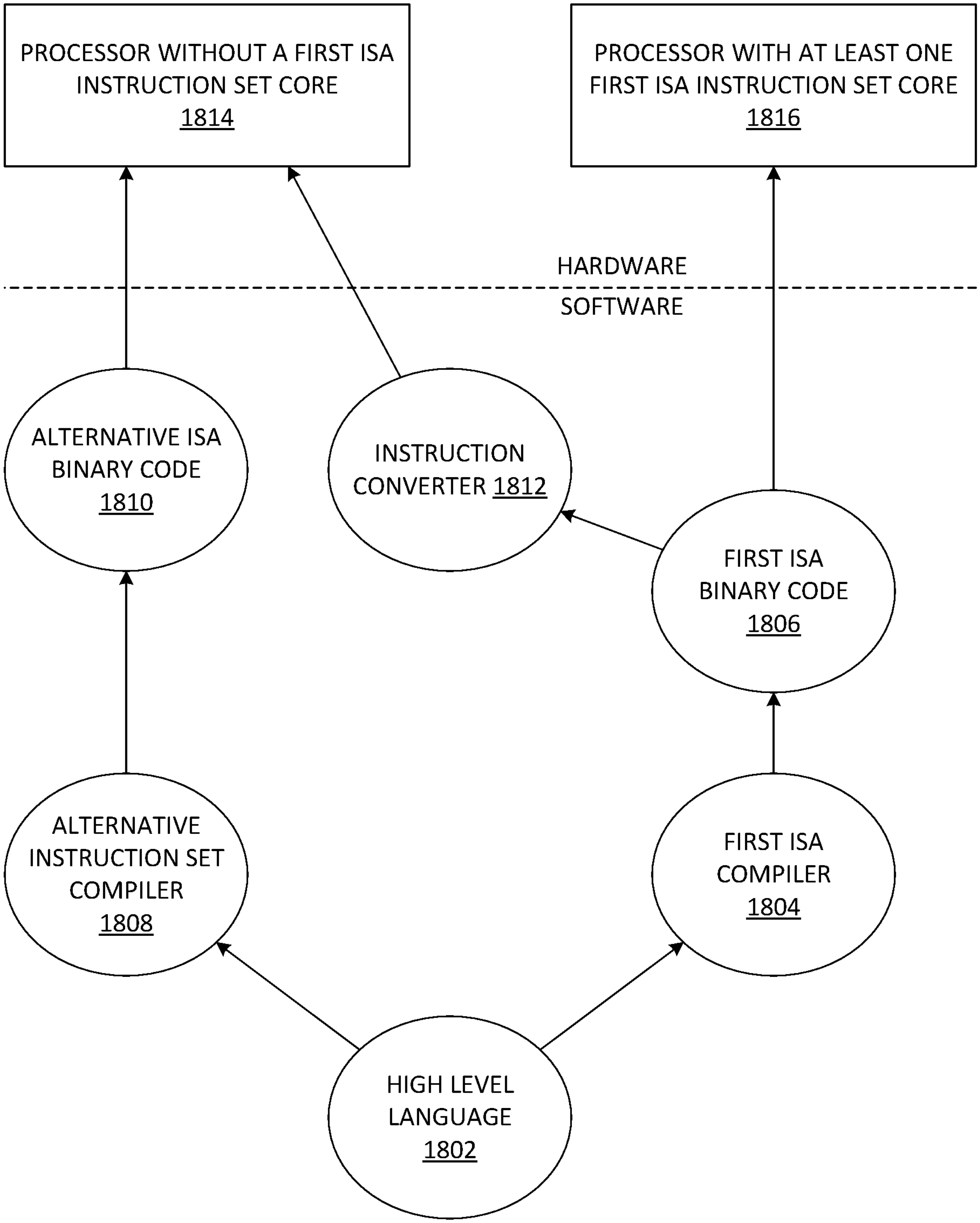
FIG. 18 is a block diagram illustrating the use of a software instruction converter to convert binary instructions in a source instruction set architecture to binary instructions in a target instruction set architecture according to examples.

FIG. 18 illustrates a block diagram contrasting the use of a software instruction converter to convert binary instructions in a source instruction set architecture to binary instructions in a target instruction set architecture according to examples. In the illustrated example, the instruction converter is a software instruction converter, although alternatively the instruction converter may be implemented in software, firmware, hardware, or various combinations thereof. FIG. 18 shows a program in a high-level language 1802 may be compiled using a first ISA compiler 1804 to generate first ISA binary code 1806 that may be natively executed by a processor with at least one first instruction set architecture core 1816. The processor with at least one first ISA instruction set architecture core 1816 represents any processor that can perform substantially the same functions as an Intel® processor with at least one first ISA instruction set architecture core by compatibly executing or otherwise processing (1) a substantial portion of the instruction set architecture of the first ISA instruction set architecture core or (2) object code versions of applications or other software targeted to run on an Intel processor with at least one first ISA instruction set architecture core, in order to achieve substantially the same result as a processor with at least one first ISA instruction set architecture core. The first ISA compiler 1804 represents a compiler that is operable to generate first ISA binary code 1806 (e.g., object code) that can, with or without additional linkage processing, be executed on the processor with at least one first ISA instruction set architecture core 1816. Similarly, FIG. 18 shows the program in the high-level language 1802 may be compiled using an alternative instruction set architecture compiler 1808 to generate alternative instruction set architecture binary code 1810 that may be natively executed by a processor without a first ISA instruction set architecture core 1814. The instruction converter 1812 is used to convert the first ISA binary code 1806 into code that may be natively executed by the processor without a first ISA instruction set architecture core 1814. This converted code is not necessarily to be the same as the alternative instruction set architecture binary code 1810; however, the converted code will accomplish the general operation and be made up of instructions from the alternative instruction set architecture. Thus, the instruction converter 1812 represents software, firmware, hardware, or a combination thereof that, through emulation, simulation or any other process, allows a processor or other electronic device that does not have a first ISA instruction set architecture processor or core to execute the first ISA binary code 1806.

In one or more first embodiments, a processor core comprises fetch circuitry to fetch a first instruction comprising a first opcode which is to correspond to a first one or more components of the processor core, a decoder circuit coupled to the fetch circuitry, the decoder to decode the first instruction to generate a first decoded instruction, and an execution circuit coupled to receive the first decoded instruction, wherein the execution circuit is to execute the first decoded instruction to save a microarchitectural state of the first one or more components to a repository of the processor core.

In one or more second embodiments, further to the first embodiment, the processor core further comprises a branch prediction unit (BPU), wherein the first one or more components is the BPU.

In one or more third embodiments, further to the first embodiment or the second embodiment, the processor core further comprises a branch target buffer (BTB), wherein the first one or more components is the BTB.

In one or more fourth embodiments, further to any of the first through third embodiments, the processor core further comprises a micro-operation cache, wherein the first one or more components is the micro-operation cache.

In one or more fifth embodiments, further to any of the first through fourth embodiments, the processor core further comprises a branch prediction unit (BPU), a branch target buffer (BTB), and a micro-operation cache, wherein the first one or more components comprises two or more of the BPU, the BTB, or the micro-operation cache.

In one or more sixth embodiments, further to any of the first through fifth embodiments, the fetch circuitry is further to fetch a second instruction comprising a second opcode which is to correspond to the first one or more components, the decoder is further to decode the second instruction to generate a second decoded instruction, and the execution circuit is further to execute the second decoded instruction to restore the microarchitectural state from the repository to the first one or more components.

In one or more seventh embodiments, further to the sixth embodiment, the microarchitectural state is a first microarchitectural state, and wherein the fetch circuitry is further to fetch a third instruction comprising a third opcode which is to correspond to a second one or more components of the processor core, the decoder is further to decode the third instruction to generate a third decoded instruction, and the execution circuit is further to execute the third decoded instruction to save a second microarchitectural state of the second one or more components to the repository.

In one or more eighth embodiments, further to the seventh embodiment, the fetch circuitry is further to fetch a fourth instruction comprising a fourth opcode which is to correspond to the second one or more components, the decoder is further to decode the fourth instruction to generate a fourth decoded instruction, and the execution circuit is further to execute the fourth decoded instruction to restore the second microarchitectural state from the repository to the second one or more components.

In one or more ninth embodiments, further to any of the first through fifth embodiments, the microarchitectural state is a first microarchitectural state, and wherein the fetch circuitry is further to fetch a second instruction comprising a second opcode which is to correspond to a second one or more components of the processor core, the decoder is further to decode the second instruction to generate a second decoded instruction, and the execution circuit is further to execute the second decoded instruction to save a second microarchitectural state of the second one or more components to the repository.

In one or more tenth embodiments, a method at a processor core comprises fetching a first instruction comprising a first opcode which is to correspond to a first one or more components of the processor core, decoding the first instruction to generate a first decoded instruction, and executing the first decoded instruction, comprising saving a microarchitectural state of the first one or more components to a repository of the processor core.

In one or more eleventh embodiments, further to the tenth embodiment, the first one or more components is a branch prediction unit (BPU) of the processor core.

In one or more twelfth embodiments, further to the tenth embodiment or the eleventh embodiment, the first one or more components is a branch target buffer (BTB) of the processor core.

In one or more thirteenth embodiments, further to any of the tenth through twelfth embodiments, the first one or more components is a micro-operation cache of the processor core.

In one or more fourteenth embodiments, further to any of the tenth through thirteenth embodiments, the first one or more components comprises two or more of a branch prediction unit (BPU), a branch target buffer (BTB), or a micro-operation cache.

In one or more fifteenth embodiments, further to any of the tenth through fourteenth embodiments, the method further comprises fetching a second instruction comprising a second opcode which is to correspond to the first one or more components, decoding the second instruction to generate a second decoded instruction, and executing the second decoded instruction to restore the microarchitectural state from the repository to the first one or more components.

In one or more sixteenth embodiments, further to the fifteenth embodiment, the microarchitectural state is a first microarchitectural state, the method further comprises fetching a third instruction comprising a third opcode which is to correspond to a second one or more components of the processor core, decoding the third instruction to generate a third decoded instruction, and executing the third decoded instruction to save a second microarchitectural state of the second one or more components to the repository.

In one or more seventeenth embodiments, further to the sixteenth embodiment, the method further comprises fetching a fourth instruction comprising a fourth opcode which is to correspond to the second one or more components, decoding the fourth instruction to generate a fourth decoded instruction, and executing the fourth decoded instruction to restore the second microarchitectural state from the repository to the second one or more components.

In one or more eighteenth embodiments, further to any of the tenth through fourteenth embodiments, the microarchitectural state is a first microarchitectural state, the method further comprises fetching a second instruction comprising a second opcode which is to correspond to a second one or more components of the processor core, decoding the second instruction to generate a second decoded instruction, and executing the second decoded instruction to save a second microarchitectural state of the second one or more components to the repository.

In one or more nineteenth embodiments, a system comprises a memory to store a plurality of instructions, a processor core coupled to the memory, the processor core comprising fetch circuitry to fetch a first instruction of the plurality of instructions, the first instruction comprising a first opcode which is to correspond to a first one or more components of the processor core, a decoder circuit coupled to the fetch circuitry, the decoder to decode the first instruction to generate a first decoded instruction, and an execution circuit coupled to receive the first decoded instruction, wherein the execution circuit is to execute the first decoded instruction to save a microarchitectural state of the first one or more components to a repository of the processor core.

In one or more twentieth embodiments, further to the nineteenth embodiment, the processor core further comprises a branch prediction unit (BPU), wherein the first one or more components is the BPU.

In one or more twenty-first embodiments, further to the nineteenth embodiment or the twentieth embodiment, the processor core further comprises a branch target buffer (BTB), wherein the first one or more components is the BTB.

In one or more twenty-second embodiments, further to any of the nineteenth through twenty-first embodiments, the processor core further comprises a micro-operation cache, wherein the first one or more components is the micro-operation cache.

In one or more twenty-third embodiments, further to any of the nineteenth through twenty-second embodiments, the processor core further comprises a branch prediction unit (BPU), a branch target buffer (BTB), and a micro-operation cache, wherein the first one or more components comprises two or more of the BPU, the BTB, or the micro-operation cache.

In one or more twenty-fourth embodiments, further to any of the nineteenth through twenty-third embodiments, the fetch circuitry is further to fetch a second instruction comprising a second opcode which is to correspond to the first one or more components, the decoder is further to decode the second instruction to generate a second decoded instruction, and the execution circuit is further to execute the second decoded instruction to restore the microarchitectural state from the repository to the first one or more components.

In one or more twenty-fifth embodiments, further to the twenty-fourth embodiment, the microarchitectural state is a first microarchitectural state, and wherein the fetch circuitry is further to fetch a third instruction comprising a third opcode which is to correspond to a second one or more components of the processor core, the decoder is further to decode the third instruction to generate a third decoded instruction, and the execution circuit is further to execute the third decoded instruction to save a second microarchitectural state of the second one or more components to the repository.

In one or more twenty-sixth embodiments, further to the twenty-fifth embodiment, the fetch circuitry is further to fetch a fourth instruction comprising a fourth opcode which is to correspond to the second one or more components, the decoder is further to decode the fourth instruction to generate a fourth decoded instruction, and the execution circuit is further to execute the fourth decoded instruction to restore the second microarchitectural state from the repository to the second one or more components.

In one or more twenty-seventh embodiments, further to any of the nineteenth through twenty-third embodiments, the microarchitectural state is a first microarchitectural state, and wherein the fetch circuitry is further to fetch a second instruction comprising a second opcode which is to correspond to a second one or more components of the processor core, the decoder is further to decode the second instruction to generate a second decoded instruction, and the execution circuit is further to execute the second decoded instruction to save a second microarchitectural state of the second one or more components to the repository.

In one or more twenty-eighth embodiments, a processor comprises a front-end to fetch and decode instructions, the front-end comprising a fetch unit to fetch instructions from a memory, and a decoder to decode the instructions, wherein the instructions comprise a checkpoint instruction, and a back-end comprising execution circuitry to perform one or more operations corresponding to the check-point instruction, comprising the execution circuitry to store microarchitectural state information which corresponds to one or more front-end components.

In one or more twenty-ninth embodiments, further to the twenty-eighth embodiment, an encoding of the check-point instruction comprises a field to specify a first front-end component of the one or more front-end components.

In one or more thirtieth embodiments, further to the twenty-eighth embodiment or the twenty-ninth embodiment, an encoding of the check-point instruction comprises one or more fields to specify a memory location at which to store the microarchitectural state information.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e. A and B, A and C, B and C, and A, B and C).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A processor core comprising:

fetch circuitry to fetch a first instruction comprising a first opcode which is to correspond to a first one or more components of the processor core;

a decoder circuit coupled to the fetch circuitry, the decoder circuit to decode the first instruction to generate a first decoded instruction; and an execution circuit coupled to receive the first decoded instruction, wherein the execution circuit is to execute the first decoded instruction to save a microarchitectural state of the first one or more components to a repository of the processor core.

2. The processor core of claim 1, further comprising a branch prediction unit (BPU), wherein the first one or more components is the BPU.

3. The processor core of claim 1, further comprising a branch target buffer (BTB), wherein the first one or more components is the BTB.

4. The processor core of claim 1, further comprising a micro-operation cache, wherein the first one or more components is the micro-operation cache.

5. The processor core of claim 1, further comprising:

a branch prediction unit (BPU);

a branch target buffer (BTB); and a micro-operation cache;

wherein the first one or more components comprises two or more of the BPU, the BTB, or the micro-operation cache.

6. The processor core of claim 1, wherein:
the fetch circuitry is further to fetch a second instruction comprising a second opcode which is to correspond to the first one or more components;
the decoder circuit is further to decode the second instruction to generate a second decoded instruction; and
the execution circuit is further to execute the second decoded instruction to restore the microarchitectural state from the repository to the first one or more components.

7. The processor core of claim 6, wherein the microarchitectural state is a first microarchitectural state, and wherein:
the fetch circuitry is further to fetch a third instruction comprising a third opcode which is to correspond to a second one or more components of the processor core;
the decoder circuit is further to decode the third instruction to generate a third decoded instruction; and
the execution circuit is further to execute the third decoded instruction to save a second microarchitectural state of the second one or more components to the repository.

8. The processor core of claim 7, wherein:
the fetch circuitry is further to fetch a fourth instruction comprising a fourth opcode which is to correspond to the second one or more components;
the decoder circuit is further to decode the fourth instruction to generate a fourth decoded instruction; and
the execution circuit is further to execute the fourth decoded instruction to restore the second microarchitectural state from the repository to the second one or more components.

9. The processor core of claim 1, wherein the microarchitectural state is a first microarchitectural state, and wherein:
the fetch circuitry is further to fetch a second instruction comprising a second opcode which is to correspond to a second one or more components of the processor core;
the decoder circuit is further to decode the second instruction to generate a second decoded instruction; and
the execution circuit is further to execute the second decoded instruction to save a second microarchitectural state of the second one or more components to the repository.

10. A method at a processor core, the method comprising:
fetching a first instruction comprising a first opcode which is to correspond to a first one or more components of the processor core;
decoding the first instruction to generate a first decoded instruction; and
executing the first decoded instruction, comprising saving a microarchitectural state of the first one or more components to a repository of the processor core.

11. The method of claim 10, wherein the first one or more components is a branch prediction unit (BPU) of the processor core.

12. The method of claim 10, wherein the first one or more components is a branch target buffer (BTB) of the processor core.

13. The method of claim 10, wherein the first one or more components is a micro-operation cache of the processor core.

14. The method of claim 10, further comprising:
fetching a second instruction comprising a second opcode which is to correspond to the first one or more components;
decoding the second instruction to generate a second decoded instruction; and
executing the second decoded instruction to restore the microarchitectural state from the repository to the first one or more components.

15. A system comprising:
a memory to store a plurality of instructions;
a processor core coupled to the memory, the processor core comprising:
fetch circuitry to fetch a first instruction of the plurality of instructions, the first instruction comprising a first opcode which is to correspond to a first one or more components of the processor core;
a decoder circuit coupled to the fetch circuitry, the decoder circuit to decode the first instruction to generate a first decoded instruction; and
an execution circuit coupled to receive the first decoded instruction, wherein the execution circuit is to execute the first decoded instruction to save a microarchitectural state of the first one or more components to a repository of the processor core.

16. The system of claim 15, the processor core further comprising a branch prediction unit (BPU), wherein the first one or more components is the BPU.

17. The system of claim 15, the processor core further comprising a branch target buffer (BTB), wherein the first one or more components is the BTB.

18. The system of claim 15, the processor core further comprising a micro-operation cache, wherein the first one or more components is the micro-operation cache.

19. The system of claim 15, the processor core further comprising:
a branch prediction unit (BPU);
a branch target buffer (BTB); and
a micro-operation cache;
wherein the first one or more components comprises two or more of the BPU, the BTB, or the micro-operation cache.

20. The system of claim 15, wherein:
the fetch circuitry is further to fetch a second instruction comprising a second opcode which is to correspond to the first one or more components;
the decoder circuit is further to decode the second instruction to generate a second decoded instruction; and
the execution circuit is further to execute the second decoded instruction to restore the microarchitectural state from the repository to the first one or more components.

* * * * *